United States Patent [19]

Tower et al.

[11] Patent Number: 4,983,351
[45] Date of Patent: Jan. 8, 1991

[54] TOP HEAD PENETRATION, HYDRO-BALL IN-CORE INSTRUMENTATION SYSTEM

[75] Inventors: Stephen N. Tower, Washington Township, Westmoreland County; Luciano Veronesi, O'Hara Township, Alleheny County; Howard E. Braun, Pittsburgh, all of Pa.

[73] Assignee: Westinghouse Electric Corp., Pittsburgh, Pa.

[21] Appl. No.: 345,864

[22] Filed: May 1, 1989

Related U.S. Application Data

[62] Division of Ser. No. 42,183, Apr. 24, 1987.

[51] Int. Cl.$^5$ .............................................. G21C 17/00
[52] U.S. Cl. ................................... 376/254; 376/203; 376/292
[58] Field of Search ............... 376/254, 352, 353, 245, 376/260, 349, 203, 292

[56] References Cited

U.S. PATENT DOCUMENTS

| | | | |
|---|---|---|---|
| 3,930,936 | 1/1976 | aleite et al. | 376/254 |
| 4,045,283 | 8/1977 | Noyes et al. | 376/254 |
| 4,842,813 | 6/1989 | Desfontaines et al. | 376/245 |

FOREIGN PATENT DOCUMENTS 2657686  6/1978  Fed. Rep. of Germany ...... 376/254

Primary Examiner—Daniel D. Wasil
Attorney, Agent, or Firm—E. F. Possessky

[57] ABSTRACT

A hydro-ball in-core instrumentation system employs detector strings each comprising a wire having radiation sensitive balls affixed diametrically at spaced positions therealong and opposite tip ends of which are transportable by fluid drag through interior passageways through which primary coolant is caused to flow selectively in first and second opposite directions for transporting the detector strings from stored positions in an exterior chamber to inserted positions within the instrumentation thimbles of the fuel rod assemblies of a pressure vessel, and for return. The coolant pressure within the detector passageways is the same as that within the vessel; face contact, disconnectable joints between sections of the interior passageways within the vessel facilitate assembly and disassembly of the vessel for refueling and routine maintenance operations. The detector strings may pass through a very short bend radius thereby minimizing space requirements for the connections of the instrumentation system to the vessel and concomitantly the vessel containment structure. Improved radiation mapping and a significant reduction in potential exposure of personnel to radiation are provided. Both top head and bottom head penetration embodiments are disclosed.

6 Claims, 16 Drawing Sheets

TOP HEAD PENETRATION, HYDRO-BALL IN-CORE INSTRUMENTATION SYSTEM

This is a division of application Ser. No. 042,183 filed Apr. 24, 1987.

BACKGROUND OF THE INVENTION

1. Field of the Invention

This invention relates to an instrumentation system for pressurized water reactors and, more particularly, to a hydro-ball in-core instrumentation system which is of simplified construction and reduced cost and permits a significant reduction in the required size of the containment structure for the pressure vessel, and yet which affords reduced down time and radiation exposure during refueling and/or maintenance operations and increased accuracy of the power distribution map produced by the data derived from the instrumentation system. The invention also relates to the method of operation of the instrumentation system and the simplified and improved method of performing refueling and/or maintenance operations on the pressure vessel as afforded by the instrumentation system.

2. State of the Prior Art

In-core instrumentation systems are employed in pressurized water reactors to verify that the power distributions within the core are within predetermined, acceptable limits for operation. Several such systems have been developed to date; while functioning adequately for this purpose, existing such systems present a number of problems and disadvantages.

A typical automatic flux mapping system consists of a control counsel and a detector drive system, the latter comprising plural drive units, each of which has a movable detector connected to a flexible cable. Associated with each drive unit are rotary transfer mechanisms and a number of thimbles, or hollow tubes, which protrude into the reactor core. The rotary transfer mechanisms function as mechanical multiplexers and make it possible to probe any of the core paths of the reactor core with any of the detectors. One such system is disclosed in U.S. Pat. No. 3,858,191 entitled "Digital Multiplexed Position Indication and Transmission System", issued Dec. 31, 1974 and assigned to the assignee of the present invention; the '191 patent is incorporated herein by reference. U.S. Pat. No. 3,932,211, issued Jan. 13, 1976, entitled "Method of Automatically Monitoring the Power Distribution of a Nuclear Reactor Employing Movable In-Core Detectors" and assigned to the assignee of the present invention, also is incorporated herein by reference. As described in the '211 patent, the detectors are inserted into the reactor core during normal power operation according to a predetermined, intermittent, time program Upon insertion, the detectors are automatically driven through the core region along fixed, predetermined paths. The outputs of the detectors are recorded as a function of core location to provide a representation of the reactor power distribution. Other related patents assigned to the common assignee herewith disclosing various aspects of automatic flux mapping systems, include U.S. Pat. Nos. 4,255,324, 4,268,354 and 4,239,595, likewise incorporated herein. Ser. No. 950,651, cited in the U.S. Pat. No. 4,239,595, issued as U.S Pat. No. 4,268,354, also is incorporated herein.

The '595 patent, for example, discloses a movable in-core instrumentation system which is inserted from the bottom of the reactor vessel 8. FIG. 1 shows a basic system as disclosed in the '595 patent which is utilized for insertion of the movable miniature detectors, i.e., movable in-core neutron detectors 12, one of which is shown in an enlarged view in FIG. 1. Retractable thimbles 10, into which the miniature detectors 12 are driven, take the route approximately as shown; more specifically, the thimbles 10 are inserted into the reactor core 14 through conduits which extend from the bottom enclosure, or head, 9 of the reactor vessel 8 through the concrete shield 18 and then up to a thimble seal table 20. Since the movable detector thimbles 10 are closed at the leading (reactor) end, they are dry inside. The thimbles 10 thus serve as a pressure barrier between the reactor water pressure, i.e., 2500 psia, and the atmosphere. Mechanical seals between the retractable thimbles 10 and the conduits are provided at the seal tables 20. The conduits 22 are essentially extensions of the reactor vessel 8 with the thimbles 10 allowing the insertion of the in-core instrumentation movable miniature detectors 12. During operation, the thimbles 10 are stationary; they are retracted only under depressurized conditions such as occur during refueling or maintenance operations. Withdrawal of the thimbles 10 to the bottom of the reactor vessel 8 is also possible if work is required on the vessel internals.

The drive system for the insertion of each miniature detector includes basically a drive unit 24, limit switch assemblies 26, a five-path rotary transfer mechanism 28, a ten-path rotary transfer mechanism 30, and isolation valves 32, as illustrated in FIG. 1. Each drive unit 24 pushes a hollow helical wrap drive cable into the core 14 with a miniature detector 12 attached to the leading end of the cable and a small diameter coaxial cable, which communicates the detector output, threaded through the hollow center back to the trailing end of the drive cable. As a set of detectors 12 enters the core, output electronics are initiated and continue monitoring the detectors' performance through the entire flux scan of that set. The function of the automatic flux mapping system console SC is to automatically probe all of the required core paths, record the measurements, or readings, from the detectors 12, and present this information to the system operator and plant computer.

Principle disadvantages with this type of system are that: (a) the relatively limited flexibility of the drive cables for the detectors mandates that a relatively large bend radius be afforded in the path followed by the detector(s) and associated drive cable(s), extending from the generally vertical axial path within the vessel 8 as to a generally horizontal orientation within the conduit 22; this large bend radius requirement consumes 10 to 12 feet of extra height, beneath the bottom head 9 of the vessel 8, of the reactor containment building, and thus imposes an economic penalty on the unit; (b) the nature of the movable in-core detector requires that it employ high pressure, leaf-free thimbles and seals, increasing the potential of their becoming sources of leaks, radiation exposure, and maintenance downtime; (c) the presence of bottom penetrations in the reactor vessel increases the potential for adverse consequences in the event of a melt down accident or more severe recovery problems if a "bottom penetration" should fail and cause a LOCA (loss of cooling accident); and (d) as later clarified, since the thimbles are disposed within the core, as are the associated detectors and drive cables, retraction of both the cables and the thimbles as is required during refueling and related maintenance operations results in potential exposure of personnel to radioactive radiation, both as an inherent characteristic of the movable elements themselves and also due to the increases potential of leakage of primary fluid through seals necessitated by the requirement for movement of both the thimbles and the drive cables.

An alternative type system for determining neutron flux distribution is shown in U.S. Pat No. 3,711,714 and is known in the trade as a type of "Aero-ball" system. An "Aero-ball" system employs small diameter balls which are blown by a gas stream into sealed thimbles defining fixed guide paths within the core; after exposure, the balls are extracted from the core by reversing the gas stream. They are then read out (counted) outside of the reactor vessel to provide axial and radial power distribution data. In this system, the balls and the associated thimbles enter the reactor vessel through the top head: as a consequence, the structure of the upper internals is structurally very complicated, to permit the insertion of the high pressure thimbles through the head and the upper internals of the vessel, down into the core which is disposed in the lower internals of the vessel This complex system inflicts extra downtime and exposure to radiation during refueling operations, to accomplish the necessary removal and storage of the plural, separate internal thimble assemblies. Moreover, each of the thimbles is a long (approximately 2½ core lengths) and very fragile structure.

Whereas these prior art systems, as noted at the outset, are functional for the intended purpose, they introduce certain problems and disadvantages as have been discussed briefly in the foregoing. As a result, there exists a real and continuing need for an improved in-core instrumentation system. More specifically, an ideal in-core instrumentation system is one which: (a) will take and readout a core power distribution map quickly and accurately; (b) does not increase the height of the containment and shield structures and, hence, the reactor building; (c) does not inflict any additional outage penalties during refueling operations; (d) does not increase operational risks; (e) is reliable, easy to operate and maintain; and (f) minimizes radiation exposure to personnel.

SUMMARY OF THE INVENTION

The present invention accordingly has the general object of achieving the above-described characteristics of an ideal in-core instrumentation system.

More particularly, the present invention has the object of reducing the vertical height requirements imposed by installation of an instrumentation system, relative to those of the prior art, while eliminating thimble withdrawal or upper internal thimble segment removal, and thereby both simplifying the structure and reducing downtime for the refueling outage. A further object of the invention is to permit substantially all operations of the instrumentation system to be performed remotely, thereby to reduce radiation exposure. Yet another object is to eliminate removable thimble seals and related, potential leaks, thereby reducing maintenance radiation exposure. Yet another object of the invention is to permit simultaneous insertion and removal of all detectors thereby to offer a potential, significant increase in power distribution map accuracy, compared to systems using movable detectors which function to make measurements in a sequential manner and thus over a longer period of time.

The foregoing objects and advantages of the present invention are achieved in accordance with the new and novel structure of the instrumentation system of the invention and its improved operating characteristics and method of operation and, as well, the simplification afforded thereby in the performance of refueling and/or maintenance operations on the pressure vessel.

More particularly, the present invention employs a plurality of detector strings, each comprising a plurality of small diameter balls mounted in spaced relation on a flexible, thin wire. The structure of each detector effectively eliminates the possibility of losing the small balls inside the primary coolant system. A small diameter tube extends from each core instrumentation position to a remote position, exteriorly of the pressure vessel. A corresponding detector string of balls is received in each such tube from a remote position relative to the vessel, and is guided in its path of movement by the interior surface of the tubing, in response to a stream of primary coolant that flows through the tubing and past the string and induces movement thereof. While this results in the primary coolant boundary of the vessel being extended beyond the reactor vessel itself in accordance with the form and length of the small diameter tubes, the guide tubes inside the reactor vessel, which direct the detector string to and from the core, do not have to be hermetically sealed and, instead, may employ easy-to-make, slip-fit or face contact connections. One such detector string and guide tube is provided for each radial core position to be read out for the mapping operation. Approximately 40 to 60 of the detector ball strings and associated guide tubes are required to develop the core map in a commercial size, pressurized water reactor. For example, a typical two or three loop plant will employ approximately 50 (e.g., 40 to 60) of the detector strings and associated guide tubes.

In a preferred embodiment of the invention, the approximately 50 detector strings are stored externally of the reactor vessel in a detector string storage chamber and coupled through corresponding tubes to the vessel. By this provision, the approximately 50 detector strings may be blown simultaneously into position by the primary coolant fluid flow, or stream, and, correspondingly, may be withdrawn simultaneously by a reverse such flow.

A single transfer device has 50 corresponding inputs connected through associated tubes to the respective 50 detector string storage positions within the detector storage chamber. The single transfer device selects the detector strings in individual succession from the 50 input positions and corresponding connecting tubings, and directs same to a gamma counter, again, in individual succession. The use of a single gamma counter is desirable since this enables minimization of any calibration errors which would be inherent in the use of multiple counters for this function.

The versatility and adaptability afforded by the use of the detector strings of balls in accordance with the present invention, and the associated transfer mechanisms therefor, afford an option of either top or bottom reactor vessel penetration for insertion of the detector strings in accordance with first and second embodiments of the invention disclosed herein, the top penetration embodiment offering additional benefits of reduced consequences of any small LOCA or core melt down accidents.

The foregoing and other features and advantages of the hydro-ball in-core instrumentation system in accordance with the present invention will become more apparent from the following detailed description, taken in conjunction with the drawings.

DESCRIPTION OF THE PREFERRED EMBODIMENTS

Figure 2:
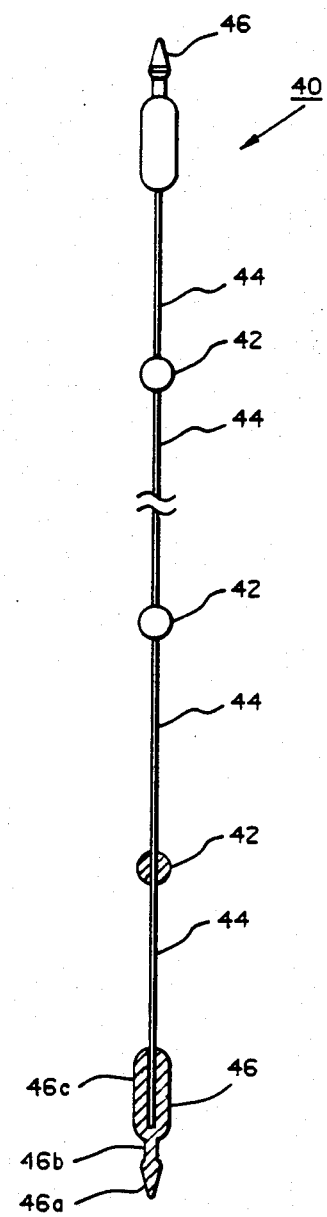
FIG. 2 is a schematic illustration, partly in cross-section and partly broken-away, of a detector string in accordance with the present invention.

FIG. 2 is a plan view, partially broken away and partially in cross-section, of a detector string 40 in accordance with the present invention; it comprises a plurality of balls 42 mounted at approximately 2-inch spacings on a wire 44 having tip pieces 46, of identical configurations, at its opposite ends. The balls 42 are of approximately 0.2 inches in diameter and are formed of stainless steel containing manganese, i.e., a manganese steel alloy, which is well known in the art and functions as a gamma emitter with a 2.6 hour half life. The 2.6 hour half life is considered sufficiently long, such that accurate compensation for decay after exposure can be made, i.e., the detected radiation level does not overly attenuate, following exposure and prior to read out, as would happen if a very short half life isotope were employed, in the alternative, as the gamma detector element. On the other hand, the half-life is short enough in time such that the radiation level of the detector string 40 will decay to a sufficiently low level of activity within 8 to 12 hours, such that it may be available for re-use following that time period.

The length of the wire 44, and thus the distance between the opposite ends of tip pieces 46, is dependent on the height of the core, or lower internals, of the reactor vessel with which the instrumentation system is used and the number thereof as well is dependent on the size and power level of the vessel. As a specific example, one particular pressurized water reactor, yielding 600 megawatts of electric power and having a core design employing 145 standard Westinghouse 17×17 fuel assemblies, would require 48 in-core detectors 40 of the type of FIG. 1 for developing an adequate power distribution map. While the 2-inch interval spacing of the balls 42 may afford adequate axial power resolution for the in-core detectors for the exemplary and illustrative system, it is believed apparent that the spacing and number of balls, per detector, and the number of detectors may vary with the resolution requirements of a given installation.

For the illustrative case, however, a total of 72 balls would be employed for a 12-foot high core, to which the height of the detector 40 would correspond. The balls 42 are 0.188 inches in diameter and are affixed to a 0.30 inch diameter stainless steel wire 44 at the indicated 2-inch spacing. The complete detector 40 for this specified installation weighs approximately 0.2 pounds, or about 3 ounces.

The configuration of the tip pieces 46, comprising an arrowhead portion 46a, a reduced neck portion 46b, and an elongated, cylindrical shank portion 46c, affords high induced fluid drag, and thus movement, of the detector string 40 in response to the flow of the primary coolant fluid thereover, and also serves to span small gap spaces in the guide tubing and serves as a handling grab, all as later hereinafter described.

A significant advantage afforded by the detector string 40 of the present invention is the capability of moving it through a very tight radius bend; this is afforded both by the flexibility of its structure and its configuration, especially that of the tip pieces 46 which affords sufficient flow induced drag force for moving the detector 40 through a tight radius bend. For the specific example, the calculated friction drag for the detector string 40, when moving through a 90°, 12-inch radius bend in its enclosing guide tube, is approximately 0.8 pounds. From this calculation, it is estimated that a minimum of 1 pound to a maximum of 2 pounds of flow induced drag force will be needed to move the detector string 40 through 0.211 inch ID tubing, which can be achieved by supplying a primary coolant flow rate of 100 to 200 pounds per hour (0.2 to 0.4 GPM). Thus, for the illustrative system, a total system primary coolant flow rate of 10 to 20 GPM will suffice to move all 48 detector strings simultaneously either into or out of the core. The velocity of the primary coolant flow and the corresponding movement of the detector string 40 resultant therefrom will be in the range of 3 to 5 feet per second. As further illustrated hereinafter, approximately 50 to 100 linear feet of each guide tube will be required, to extend between the external temporary storage chamber for the detectors 40 and the core of the reactor vessel. Correspondingly, for the indicated range of velocities, the 48 detector strings 40 will require from 15 to 30 seconds to traverse, simultaneously, the respective, 50 to 100 linear feet long guide tubes extending between the external temporary storage chamber and the core.

Figure 3:
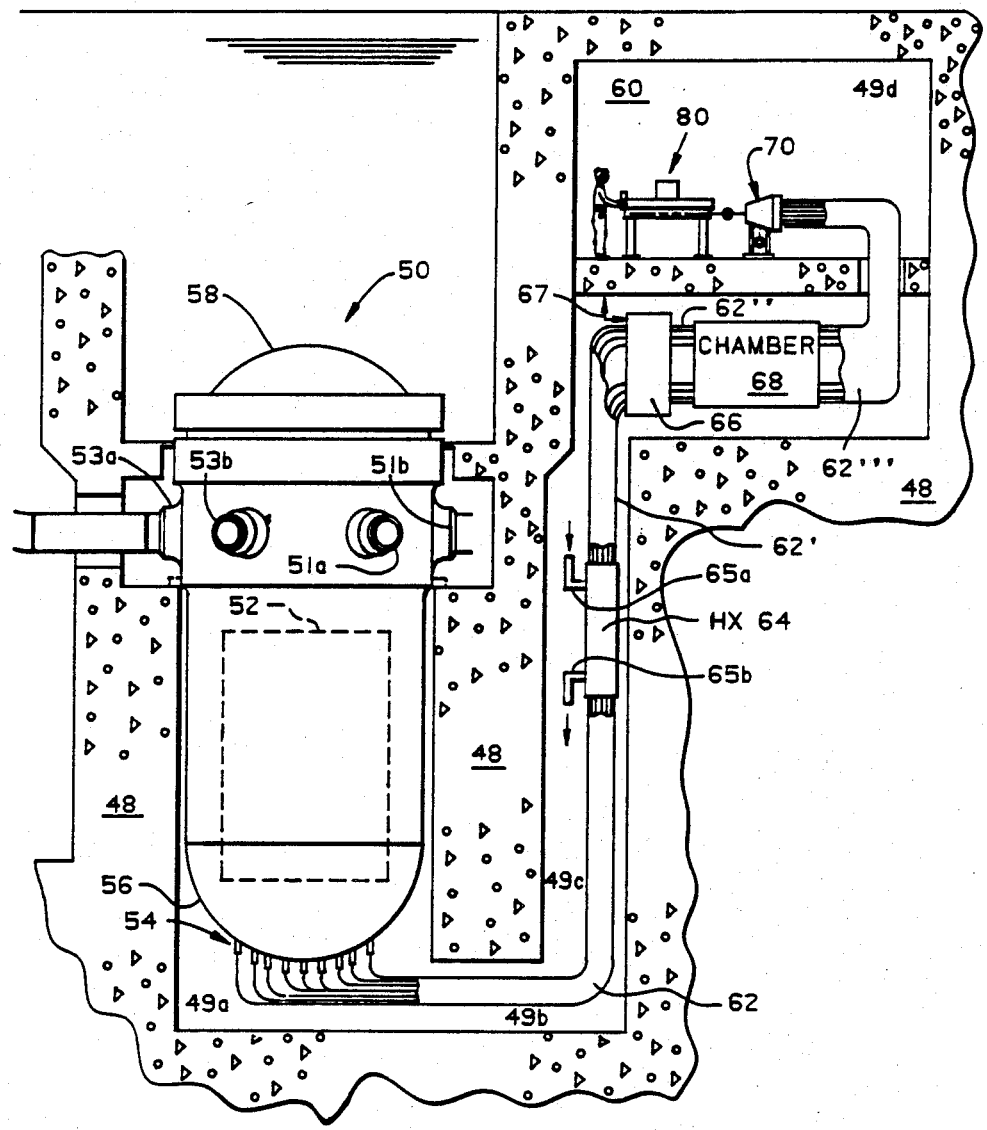
FIG. 3 is a schematic illustration of a reactor vessel and associated containment structure employing the instrumentation system of the present invention in accordance with a first embodiment thereof.

FIG. 3 is a schematic, partially brokenaway, and generally elevational view of a pressure vessel 50 employing an instrumentation system 60 in accordance with the present invention. The vessel 50 is mounted in a containment structure 48 of reinforced concrete, formed in a conventional manner, but configured to include an open area 49a beneath the vessel 50 communicating through a horizontal passage 49b and a vertical passage 49c to an in-core instrumentation system (ICIS) read-out room 49d, the passages 49a, b and c accommodating piping 62 and other apparatus, later described, for transport of the detector strings 40 between the handling, control, and sensing apparatus of the instrumentation system 60 mounted within the ICIS read-out room 49d and the core 52 (also generally termed the "lower internals") of the vessel 50.

In accordance with this first embodiment of the present invention, the tubes 62, through which the detector strings 40 pass, extend through bottom penetrations 54 which mount through the sidewall of the lower dome enclosure, or lower head, 56 of the vessel 50. As before noted, a second embodiment of the present invention, subsequently described, provides for the alternative of top head penetration, i.e., the transport tube for the detectors 40 extend through top penetrations in the sidewall of the upper dome enclosure, or upper head 58. In either instance, the interior passageways of the small diameter tubes 62 are in communication with and thus at substantially the same pressure as the primary coolant within the vessel 50. Thus, the primary coolant pressure boundary of the vessel 50 effectively is extended beyond the walls of the reactor vessel 50 and encompasses the small diameter tubes 62. Accordingly, the containment structure 48 bounds the small diameter tubes 62 and related components of the instrumentation system 60, as is illustrated in FIG. 3. A significant advantage is gained, however, in that the guide tubes inside of the reactor vessel 50, which direct the associated detector strings 40 to and from the necessary sensing positions in the core 52, do not require hermetic sealing within the internals of the vessel 50, thus enabling the utilization of easy-to-make, slip-fit or face-contact connections, as later described.

In accordance with the invention, there is one detector string 40, of the type shown in FIG. 2, and an associated guide tube for each radial core position within the core 52 which is to be sensed and thus read-out. Approximately 50 of the detector strings 40 and associated guide tubes would be employed in a typical two or three loop plant. As is conventional and well known in the art, a two loop plant typically is in the 600 megawatt range of electric power generation, and employs two steam generators and two associated pumps with corresponding sets of two cold primary coolant inlet nozzles 51a and 51b, and tWo hot, primary coolant outlet nozzles 53a and 53b, as illustrated in FIG. 3. A three loop plant, on the other hand, has a typical power output in the range of 900 to 1,000 megawatts and includes three associated sets of components corresponding to the described sets for a two loop plant. The corresponding relationship and required number of components will be apparent, in relationship to a four loop plant which produces typically in the range of 1,000 to 1,200 (or more) megawatts of power output. Thus, it is to be understood that whereas the present invention is described with regard to an illustrative two loop plant, it is in no sense limited to any specific number of loops or power output capability, and the number of the detectors 40 and associated small diameter tubes will be selected in accordance with the size of the plant and the desired mapping resolution.

Inherent in the structure of the detector string 40 of the present invention is its capability of being passed through very small diameter tubes 62 and particularly through very small, or short, bend radii of such tubes in the order of 4 to 8 inches, without inducing excessive drag and pressure drop. Actual tests have demonstrated that the detector string of the invention will flow through a bend radius of 2.6 inches; thus, bend radii in the range of 4 to 8 inches are readily achieved. This small tube bend radii facilitates either the bottom entry, or penetration, configuration as shown in FIG. 3 and mentioned above, or the top penetration through the upper dome enclosure, or head, 58 as likewise mentioned above and described in further detail hereinafter.

Figure 1:
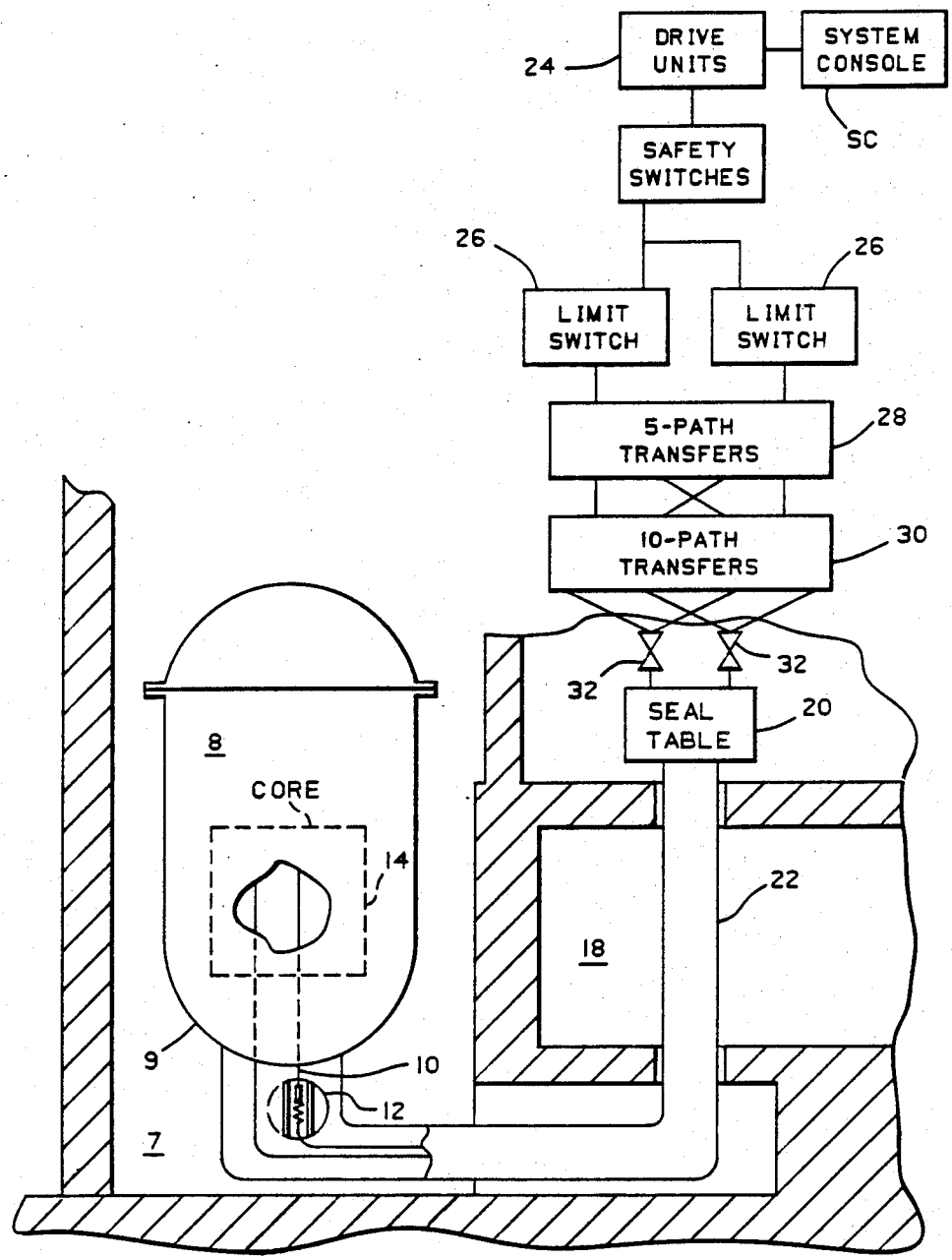
FIG. 1 is a schematic illustration of a prior art instrumentation system.

Of particular significance to the bottom penetration configuration employed in the vessel 50 of FIG. 3 is the fact that the space beneath the lower head 56, which must be afforded within the containment structure 48, is significantly reduced. For example, as shown in FIG. 3, for a two loop system, forty-eight (48) tubes 62 are connected through a corresponding number of bottom penetrations 54 and internal tubing to the appropriate positions within the core 52. The space 49a between the lower-most extent of the lower head 56 and the containment structure 48, for accommodating the tubes 62, may be on the order of two to three feet. By contrast, the guide thimbles used in the referenced, prior art movable detector system, given the ten to twelve foot bend radii required therefor, would correspondingly require a space 7 as shown in FIG. 1 of 12 to 15 feet, and thus an additional nine feet or more greater than that required for the instrumentation system of the present invention. The present invention accordingly provides a significant advantage in terms of the reduced size and substantial savings in cost of the containment structure 48 within which the vessel 50 employing the instrumentation system 60 of the invention may be installed, compared to the prior art movable thimble detector systems.

FIG. 3 also illustrates additional components, common to either of the basic, bottom and top head penetration (the latter being described subsequently) embodiments of the present invention. The forty-eight (48) tubes 62 pass through a heat exchanger 64, continuing tube portions 62' being connected to a system of solenoid valves 66, further tube portions 62" interconnecting the valves 66 to a detector string storage chamber 68 and further tube portions 62''', interconnecting chamber 68 to a transfer device 70. As will become clear, storage chamber 68 may be simply that section of the tubes 62 extending between valves 66 and transfer device 70 and thus encompassing tube sections 62" and 62''', and accordingly defines individual storage positions for each of the forty-eight (48) detector strings 40. As described hereafter, each detector string 40 may be individually and selectively transported into or removed from its individual storage position in the chamber 68. Transfer device 70 enables selective withdrawal of each detector string 40 from its corresponding storage position within the chamber 68 and transfer of same to a gamma counter 80 for sensing the radiation levels detected by the balls of the individual detector string 40. Following sensing, the transfer device 70 selectively directs the sensed, or monitored, detector string 40 to a suitable, further destination. For example, transfer device 70 may withdraw a selected detector string 40 from the instrumentation system 60 for disposal or, alternatively, introduce a new detector string 40 into the system and, for example, into its appropriate storage position within the chamber 68.

The system is designed for automatic control by a controller (not shown in FIG. 3), typically disposed in the ICIS read-out room 49d, which provides for automatic control of the insertion, radiation, removal, read-out, and temporary storage or disposal of the detector strings 40. In that regard, the solenoid valves 66 are individually operated in accordance with the required procedure by the controller (not shown), as indicated by the bi-directional control buss 67 connected between the valves 66 and the detector (not shown).

The transfer of the detector strings 40 through the associated tubes 62 and other apparatus, as before noted, is performed by directing a flow of primary coolant thereover: a circulation pump for that purpose (not shown in FIG. 3) is provided in the ICIS read-out room 49e. The primary coolant withdrawn from the vessel 50, however, is typically at 600° F., a level which could produce damage or impose undesired requirements on various of the apparatus of the instrumentation system 60, such as the solenoid valves 66 and the transfer device 70. Accordingly, a heat exchanger (HX) 64 having secondary coolant inlet and outlet connections 65a and 65b is provided in the path of the tubes 62 intermediate the vessel 50 and the solenoid valve 66 for reducing the temperature of the primary coolant withdrawn from vessel 52 to, e.g., ambient.

Figure 4A:
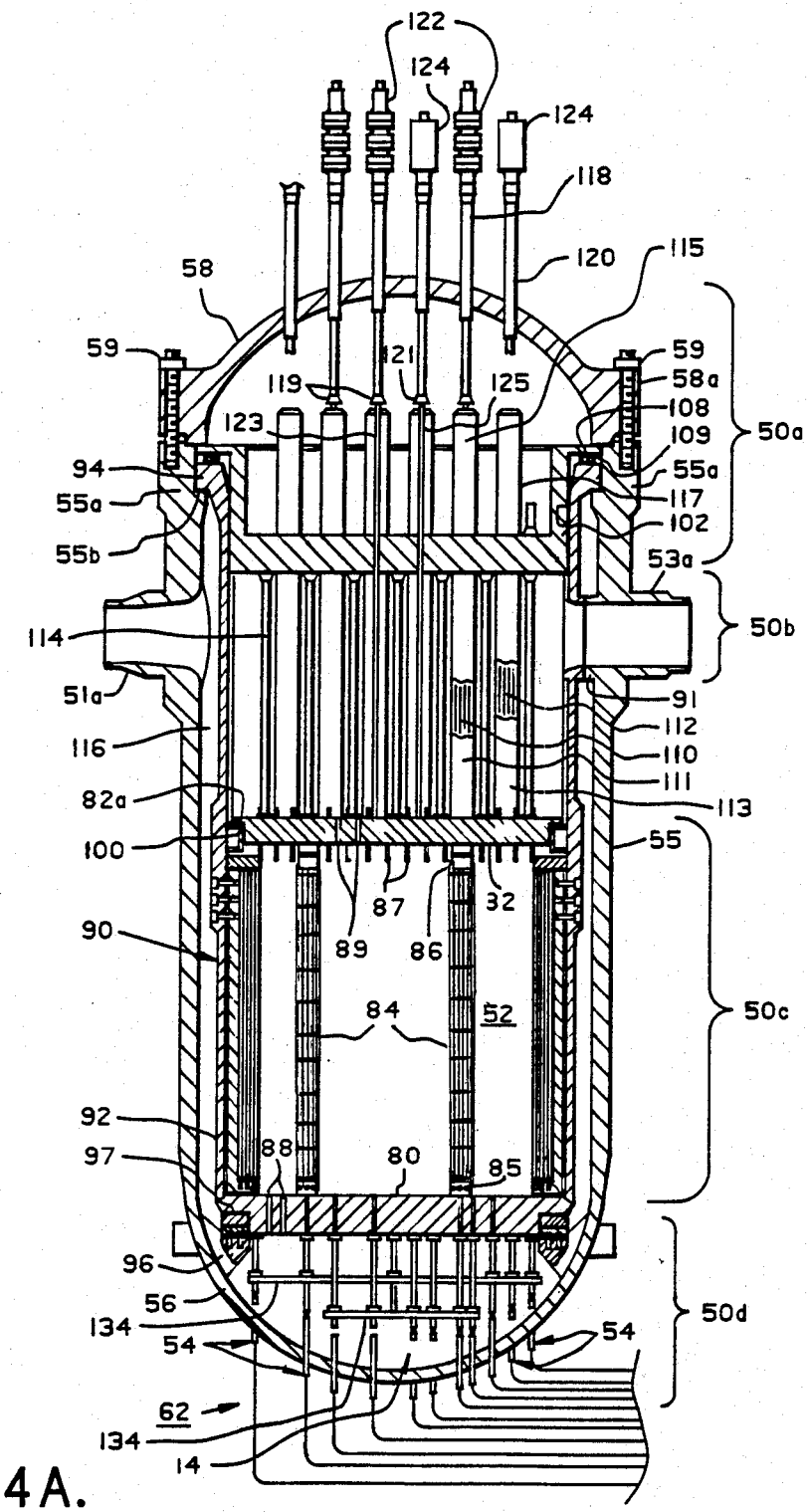
FIGS. 4A and 4B are simplified elevational views, partially in cross-section and partially broken-away, illustrating, in common, relevant conventional components of a reactor vessel and, respectively, the elements associated with the instrumentation system of the invention in accordance with a first, bottom head penetration embodiment (i.e., FIG. 4A) and a second, top head penetration embodiment (i.e., FIG. 4B)
Figure 4B:
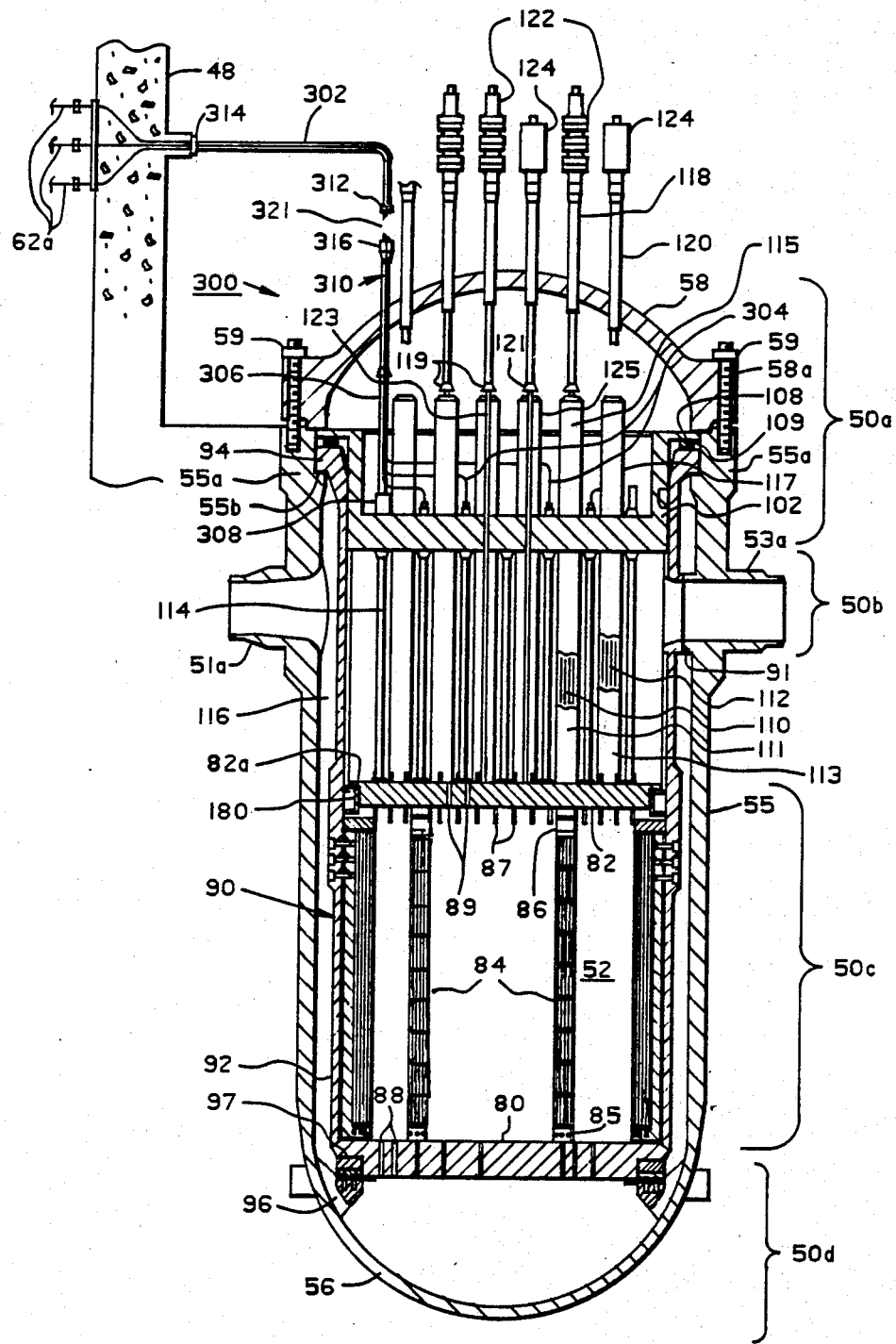

FIGS. 4A and 4B are elevational, cross-sectional views, partly schematic and partly broken away, illustrating the internal structure of a conventional pressure vessel 50; FIG. 4A, moreover, illustrates the installation therein of an instrumentation system 60 in accordance with the bottom head penetration configuration of the first embodiment of the invention, and FIG. 4B illustrates the top head penetration configuration of the second embodiment of the present invention. Attention initially is addressed to the conventional elements of the vessel 50 shown substantially identically in FIGS. 4A and 4B.

The vessel 50 includes a generally cylindrical sidewall 55, through which extend an illustrative cold primary coolant inlet nozzle 51a and an illustrative hot primary coolant outlet nozzle 53a. The sidewall 55 is enclosed at its bottom by a bottom dome enclosure, or bottom head, 56 The upper end of the sidewall 55 includes an enlarged annular flange 55a further defining an internal annular ledge 55b. The upper head 58 includes a mating enlarged flange 58a which is received on the enlarged annular flange 55a of the sidewall 55 and is secured thereto by bolts 59. Within the vessel 50 there are defined an upper head region 50a, regions known as the upper and lower internals 50b and 50c, respectively, and a bottom head region 50d. The portions of the vessel 50 primarily relevant to the first embodiment of the present invention, as discussed in detail hereinafter, are the lower internals 50c and the bottom head region 50d of FIG. 4A; by comparison, those portions primarily relevant to the second embodiment are the upper head region 50a and the upper internals 50b, along with the instrumentation thimbles within the fuel rod assemblies of the lower internals 50c, of FIG. 4B. In the interests of completeness, however, the remainder of the conventional portions of the vessel 50 commonly illustrated in FIGS. 4A and 4B are also discussed at this juncture.

The lower internals 50c include the core 52 comprising a large number of fuel rod assemblies 84 positioned in densely packed parallel axial relationship, mounted to and supported by lower fuel rod nozzles 85 on a lower core plate 80. The lower core plate 80 is joined, either integrally or by welding, at its outer perimeter to an outer barrel assembly 90 and particularly to the lower edge of the cylindrical sidewall 92 of the outer barrel assembly 90. The upper end of the cylindrical sidewall 92 is joined, either integrally or by welding, to an annular flange 94 which extends radially outwardly and is received on internal annular ledge 55b. The weight of the core 52 is supported through the outer barrel assembly 90 on the flange ledge 55b. Brackets 96 are affixed to the interior of the lower head 56 and project radially inwardly, so as to be received by corresponding key recesses 97 in the core plate 80 which thereby provide radially positioning, or alignment, of the lower core plate 80 and the associated elements of the lower internals assembly 50c.

The upper ends of the fuel rod assemblies 84 are releasably secured by upper fuel rod nozzles 86 to the bottom surface of an upper core plate 82, the latter forming a part of the upper internals assembly 50b, later described. Pins 87, illustratively shown in association with the upper core plate 82, serve to align and secure the upper ends of the fuel rod assemblies 84 in position. Flow holes 88 in the lower core plate 80 and similar flow holes 89 in the upper core plate 82 provide for the flow of primary coolant through the core 52 and into the upper internals 50b, described in further detail hereafter.

The upper internals 50b extends from the upper surface, in essence, of the upper core plate 82 to an upper internal support assembly 102, comprising a relatively thick, generally circular support plate 104 joined either integrally or by welding to a generally cylindrical sidewall 106, which in turn is joined at its upper end to an outer, annular flange 108. The annular flange 108 is received on a generally annular Bellville Spring ring 109. The head 58, when secured in position by bolts 59, bears against the flange 108, and in turn the Bellville Spring ring 109 exerts a resilient hold-down force on the ledge 55b of the lower internals assembly 50c for stabilizing the inner barrel assembly 90 within the vessel 50.

Within the upper internals 50b, there are provided a plurality of upper internals support columns 14 which extend between and are rigidly secured to the bottom surface of the support plate 104 and the top surface of the upper core plate 82 and which thus provide a suspension-type support of the upper core plate 82. Radially inwardly projecting keys 100, typically four (4) in number, are received in corresponding radial recesses 82a of the upper core support plate 82, for radially positioning of the upper core plate 82, in conventional fashion.

Plural rod guides 111 and 113 (only a few of each being shown) likeWise extend between and are secured at their opposite ends to the upper core support plate 82 and the upper internals support plate 104 and, in conventional fashion, telescopingly receive respective control rod clusters 110 and 112 therewithin, providing for movement thereof into and out of the core 52 in association with the fuel rod assemblies 84, in conventional fashion. The rod clusters may be of first and second, different types, known as RCC rod clusters and part length rod clusters [as shown at 110 and 112, respectively, within the upper internals region 50b] and which are supported through respective, plural drive rods 123 and 125 which extend coaxially through head extensions 118 and 120, respectively, to be engaged and controlled in position by respective drive mechanisms 122 and 124. Drive mechanism 122 may be a magnetic jack control rod guide mechanism (CRDM) and drive mechanism 124 may be a roller nut CRDM, of conventional types. The rod guides 111 and 113 serve to protect the respective rod clusters 110 and 112 from turbulent and vibrational forces imposed thereon by the primary coolant flow which passes through the upper internals 50b. As later more fully described, that flow passes in a generally axial direction from the core 52 into the upper internals 50b and within which the flow turns through a 90° angle to exit from the primary coolant outlet nozzle 53a. Within the upper head region 50a, corresponding, plural upper head region rod guides 115 and 117 are mounted on the upper internal support plate 104, and serve a similar purpose of protecting the respective rod clusters 110 and 112 from turbulence and cross-flow of the primary coolant within the upper head region 50a.

The head extensions 118 and 120 extend through the upper head 50a in sealed relationship therewith and the drive rods 123 and 125 correspondingly are sealed within the respective CRDM's 122 and 124. The head extensions 118 and 120 include bell-shaped cups 119 and 121 at their lower ends to facilitate alignment therewithin of the respective rod guides 123 and 125 during assembly operations.

As is known, and by the structural arrangement described, the RCC rod clusters 110 and 112 are selectively movable in telescoping relationship with respect to the fuel assemblies 84, for insertion into or withdrawal from the core 52 and to selectively controlled positions therein, to alter or modulate the level of activity within the core 52 and thus the level of power generation. As is apparent, suitable openings are provided in the upper core support plate 82 and the upper internals support plate 104 to permit the full insertion into or withdrawal from the core region 52, of the respective RCC rod clusters 110 and 112. The remaining structures, not mentioned as yet but illustrated and identified by reference numerals within the upper head region 50a and the upper internals 50b, relate to the second embodiment of the invention comprising a head penetration instrumentation system and are discussed hereinafter.

A significant factor in the design of an instrumentation system for a pressure vessel of the type 50 shown in FIGS. 4A and 4B is the extent of adjustment, or relocation, of its constituent components, as is required during refueling or other periodically performed maintenance operations. To better understand the significant advantages afforded by the present invention, in both of its disclosed embodiments, it is useful first to consider the principal disassembly and reassembly operations required in such refueling and maintenance operations for the vessel 50. Very generally, during a standard plant rodded refueling operation, the rod clusters 110 and 112 are fully inserted into the core 52 by the respective CRDMs 122 and 124 and the associated drive rods 123 and 125 then are released from the CRDMs 122 and 124. The top head 50a then is lifted off, the associated drive rods 123 and 125 remaining in the upper internals assembly 102. The drive rods 123 and 125 are uncoupled from the respective rod clusters 110 and 112 and then the upper internals assembly 102, including the retained drive rods and comprising both the upper internals support plate 104 and the upper core plate 82 connected thereto by the upper internals support columns 114, is withdrawn. The fuel rod assemblies 84 thereby are rendered accessible, for performing conventional refueling functions. When required, for maintenance or other purposes, the core 52 may be removed by raising the lower internals assembly 90 by engaging the upper end of the barrel 92.

Significant to the instrumentation provisions, it will be appreciated that various mechanical interfaces exist within the vessel 50 with regard to the elements (e.g., hollow tube guide structures, or thimbles) which define the path for movement into and withdrawal from the core region 52 of detector elements, whether in accordance with the present invention or the prior art systems. Directing attention first to a bottom head penetration instrumentation system as disclosed in the Figures thus far described, the detector guide structures and tubes, or guide path defining elements, must extend through the bottom head 54 and the lower core plate 80 and into the core 52 throughout its full axial height, and be uniformly distributed throughout the cross-sectional area thereof.

Typically, in the prior art systems hereinabove described, a removable thimble is inserted through the described path and through an interior channel provided therefor within each fuel rod assembly 84. Prior art thimbles, which are hermetically sealed from the primary coolant within the vessel 50 and thus within the core 52, thus must have sufficient structural integrity to withstand the substantial pressure (2,250 psi) within the vessel 50—leading to the relative rigidity of such prior art thimbles and the relatively large bend radii before referenced. Moreover, because of the need to remove and/or rearrange the fuel assemblies 84 on a periodic basis, the interface of the fuel rod assemblies 84 at their lower nozzles 85 with the lower core support plate 80 presents a critical operating impediment. Specifically, the thimbles must be withdrawn from within the fuel rod assemblies 84 and positioned below the lower core plate 80, to permit removal of the corresponding fuel rod assemblies 84 for rearrangement, or for replacement with fresh fuel rod assemblies 84, after which the thimbles must be reinserted. In addition to the alignment problems thus imposed, considerable care must be exercised so as not to abrade or rupture the sidewalls of the thimbles in these withdrawal and reinsertion operations. As will also be apparent, complex seals must be provided which can withstand the pressure within the vessel 52, yet also permit the telescoping or sliding movement of the thimbles in these insertion and withdrawal operations. Aside from the potential of and/or actual mechanical wear and damage presented, the thimble withdrawal and reinsertion operations impose substantial additional down time and power outage during these necessary, periodic refueling and other maintenance operations.

The manner by which the instrumentation system of the present invention overcomes these difficult problems of prior art such systems will be better understood by reference to the following Figures. As will become clear, a significant advantage of the hydro-ball instrumentation system of the present invention is that the interior passageways defined by the instrumentation thimbles and associated guide structures are maintained at the interior pressure of the reactor vessel. As a result, the necessary interfaces in the guide paths structure to accommodate the disassembly and reassembly operations may be simple face-contact joints, such as ball and cone joints, which may be simply moved axially into or out of face-contact engagement, at all interface positions within the vessel 50. Significantly, in the bottom head penetration configuration of the first embodiment (i.e., FIG. 4A), no disconnection and/or no movement of any guide path elements is required during refueling and maintenance operations, thereby avoiding both any related down time and, significantly, any radiation exposure to operating personal.

Figure 5A:
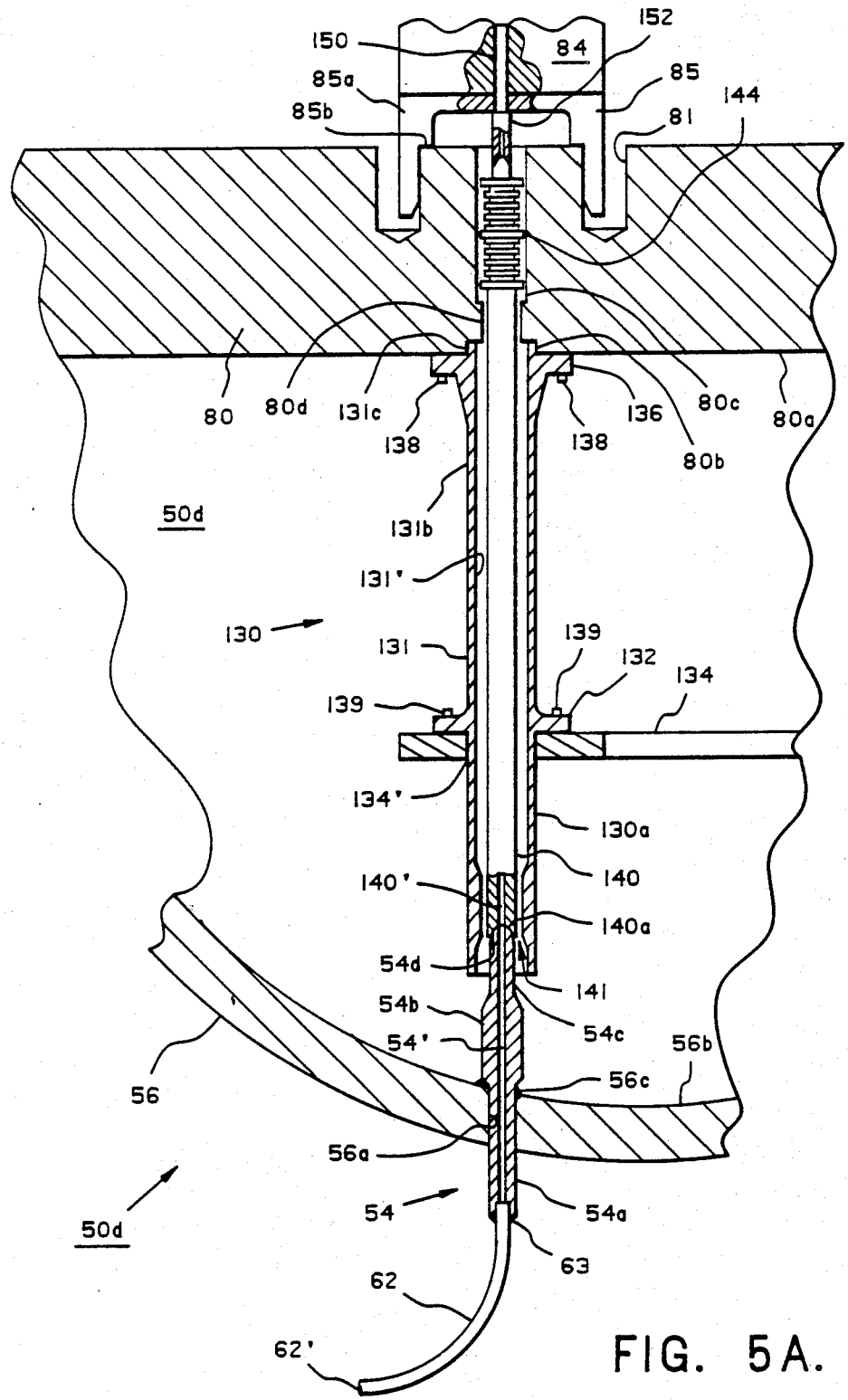
FIGS. 5A and 5B are fragmentary, cross-sectional and elevational views, partly broken-away, of the bottom head region of the vessel of FIG. 4A, FIG. 5B being an enlargement of a portion of FIG. 5A, illustrating the detector transport path in accordance with the first embodiment.
Figure 5B:
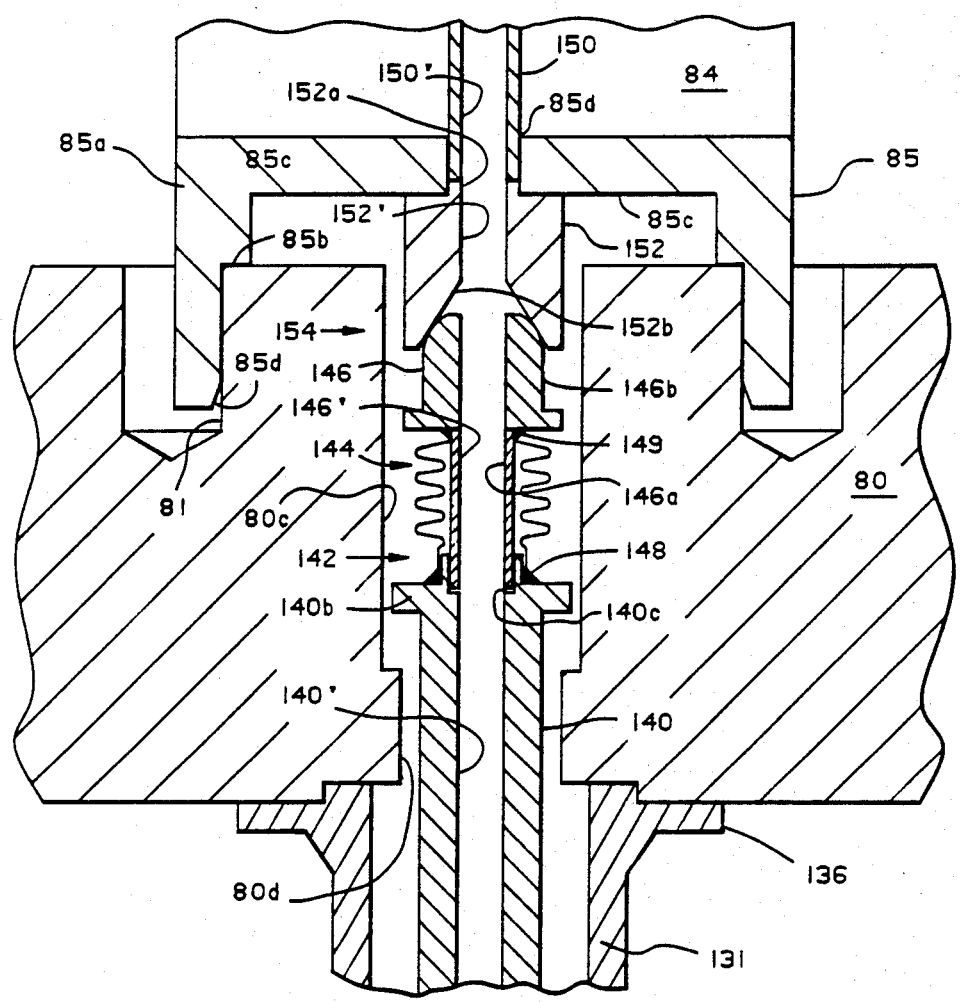

FIGS. 5A and 5B are elevational and cross-sectional views, partly schematic and broken-away, of the bottom head penetration and associated guide structures, FIG. 5B being an enlargement of the upper portion of FIG. 5A. Bottom head penetration 54 is of generally cylindrical configuration and has a central axial bore or passageway 54' therethrough in sealed communication with the hollow interior 62' of the tube 62, the latter being secured to the lower end 54a of penetration 54 by weld bead 63. The central enlarged collar 54b rests on the interior surface 56b of the lower head 56, the juncture being sealed by weld bead 56c. The upper end 54c of the penetration 54 terminates in a male cone end 54d.

An extension assembly 130 is supported within the lower head 50d and provides for removably and resiliently interconnecting the bottom head penetration 54 with an instrumentation thimble 150 mounted axially within and extending the full height of the fuel rod assembly 84, thereby to define a transport path for a detector string 40 from the penetration 54 into the instrumentation thimble 150. Wall guard tube 131 is of generally cylindrical configuration and includes an intermediate annular collar 132 which is attached to a stiffener plate 134 (of which several may be provided) which interconnects and thus secures a plurality of such wall guard tubes 131 in the desired, axially aligned positions. Particularly, the lower end 131a of the tube 131 extends through a corresponding aperture 134' in the plate 134. The upper end 131b of the tube 131 includes an annular collar 136 which abuts and is attached to the lower surface 80a of the lower core plate 80; preferably, lower core plate 80 further has a counterbore 80b which receives the protruding end 130c of the tube 130 for axially aligning the tube 130 with the bore, or passageway, 80c. Bolts 138 and 139 threadingly secure the collars 132 and 136, respectively, to the stiffener plate 134 and the lower core support plate 80. The wall guard tube 131 protects the interior portion of the extension assembly 130 from the turbulent effects of the primary coolant flowing through the lower head 50d, as previously described.

Guide tube extension head 140 includes a female cone seat 140a on its lower end which is received on the male cone upper end 54d of the bottom penetration 54, which together form a loosely sealed, detachable ball and cone joint 141 which, moreover, automatically aligns the interior bore 141' of the guide tube extension piece 140 with the interior bore 54' of the bottom penetration 54 during assembly. The upper end 140b of the guide tube extension piece 140 defines a slip joint 142 with a bellows expansion joint 144, which connect to and support a male cone extension 146. More particularly, the male cone extension 146 includes a cylindrical lower extension 146a, the lower end of which is received within an interior counterbore 140c in the upper end 140b of the guide tube extension piece 140 and is free for limited axial movement therein, and a male cone head 146b at its upper end. Bellows 145 is formed of metal and is welded at its lower end to the upper end 140b of guide tube extension piece 140, as indicated by weld line 148, and at its upper end to the upper exterior circumference of the tubular extension 146a, as indicated by weld bead 149. As will be appreciated, the bellows expansion joint 144 in conjunction with the slip joint 142 affords an axially extensible or contractible, substantially continuous interior passageway through the interior 146' of the male cone head 146 which is of the same diameter as the interior passageway through the interior 140' of guide tube extension piece 140.

The fuel bottom nozzle 85 is designed to minimize the effects of turbulence and impact of the primary coolant flow in the lower intervals 50c, on the final connection between the extension assembly 130 and the instrumentation thimble 150. Particularly, the fuel bottom nozzle 85 includes a downward extension 85a received in a hole 81 of similar geometry in the upper surface of lower core plate 80, the extension 85a being counterbored from its bottom edge to define an internal ledge 85b which rests on the mating surface of the lower core support plate 80, interiorly of the hole 81. The solid end portion 85c of the bottom nozzle 85 furthermore includes a central bore 85d which receives and has secured therein the lower end of instrumentation thimble 150. Finally, cylindrical extension piece 152 includes an annular protrusion 152a at its upper end which is received in the aperture 85d, abutting the lower end of the thimble 150, and a female cone seat 152a at its lower end which receives the male cone head 146b, these surfaces, under the upward resilient biasing of the metal bellows 145, affording a loosely sealed, disconnectable ball and cone joint 154. As is apparent, the interior surfaces 152' and 150' of the extension piece 152 and intermediate thimble 150 are of a common diameter and are axially aligned with the interior surfaces 146' and 141' thereby providing a passageway which is substantially continuous and sealed, at least sufficiently to prevent any significant cross-current of primary coolant flow within the passageway.

By virtue of the foregoing construction of the extension assembly 130, including particularly the slip-fit connection 142 with the associated bellows expansion joint 144, and the disconnectable ball and cone joint 154, the associated fuel rod assembly 84 and instrumentation thimble 150 readily may be removed from the lower core plate 80 without requiring the withdrawal or relocation of the elements defining the detector string passageway. Moreover, since the interior of the referenced passageway is maintained at substantially the same pressure as the interior of the pressure vessel 50 (e.g., 2250 psia), there is no substantial tendency of primary coolant to flow through any of the loosely sealed disconnectable joints. The structure furthermore permits removal of the lower internals package, including the core plate 80, without requiring any disassembly of the instrumentation components. Particularly, the core plate 80 and extension assembly 130 with the stiffening plates 134 secured thereto simply are removed as a complete assemblage. In this regard, the extension pieces 140 are effectively captured and removed by and with the core plate 80, as is afforded by the ball and cone, detachable connection joint 141.

More specifically, the aperture 80c through the lower core plate 80 includes a reduced diameter annular collar 80d at its lower extent, which is brought into engagement with the outer annular collar 140d of the associated guide tube extension plate 140 as the plate 80 is raised, such that the extension plate 140 is withdrawn with the core plate 80 when the latter is raised vertically for removal. For reassembly, the core plate 80 simply is lowered with the guide tube extension pieces 140 suspended therefrom and extending coaxially with their respectively associated wall guard tubes 131, such that the detachable connections 141 are completed, or reconnected, upon the lower core plate 80 reaching its intended, rest position. This arrangement also permits removing the extension pieces 140 (i.e., assuming the corresponding fuel rod assembly 84 is previously removed), simply by raising same vertically from within the bore 80c and correspondingly replacing same by lowering an extension piece 140 through the bore 80c—again, as permitted by the capability of using a simple, surface contact detachable connection joint 141.

The installation of each fuel rod assembly 84 in its proper aligned position within the recess 81 in the core plate 80 is assured by the beveled interior end surface 85d, of the extension 85a. Moreover, as the fuel rod assembly 84 is lowered into its rest position, the cylindrical extension piece 151 is axially aligned with and comes into engagement with the male cone extension 146, which is biased resiliently upwardly by the bellows expansion joint 144, for reassembly of the joint 154.

Figure 6:
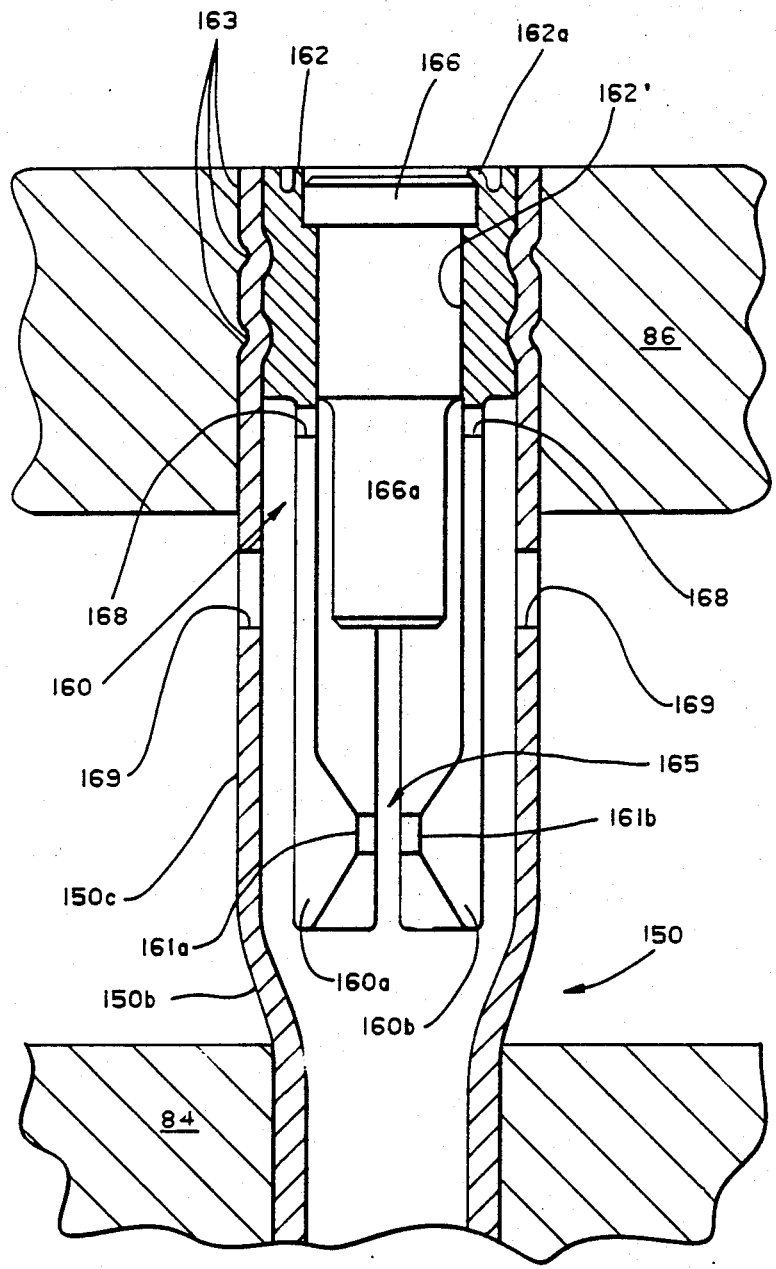
FIG. 6 is a fragmentary, elevational and cross-sectional view of the upper end portion of an instrumentation thimble in accordance with the bottom head penetration embodiment of the invention.

FIG. 6 is an elevational and fragmentary cross-sectional view of an upper portion of the fuel rod assembly 84 and the corresponding top end segment of the instrumentation thimble 150 and its associated upper nozzle 86. The upper nozzle 86 may have substantially the same configuration as the lower fuel nozzle 85 and thus may include an upwardly projecting cylindrical extension for being received in a corresponding annular channel in the lower surface of the upper core support plate 82. The thimble 150 includes a neck portion 150b, which extends above the surface of the fuel rod assembly 84 and is of a gradually increasing diameter, and which joins a relatively larger diameter, cylindrical upper end portion 150c.

A spring loaded retainer latch 160 is disposed coaxially within the cylindrical upper end portion 150c and includes a socket portion 162, secured to the top end of the upper end portion 150c of the thimble 150 by rolled seams 163, and latch spring fingers 160a, 160b, . . . depending downwardly therefrom at angularly spaced relationship about the common axis and thus in a segmented, annular configuration. Protrusions 161a, 161b, . . . extend radially inwardly at the lower ends of the spring fingers 160a, 160b, . . . , respectively, and define a spring loaded cylindrical passageway 165 therebetween having an interior passageway slightly larger than the neck portion 46b of the tip piece 46 of a detector string 40 (FIG. 2). The spring fingers are sufficiently resilient so as to be urged outwardly by the arrowhead portion 46a, as it is impelled axially upwardly by the driving force of the fluid flow during insertion of a detector string 40 into the thimble 150, and thus to latch the tip point 46 therein. A plug 166 is received within and extends through the interior bore 162' of the socket portion 162; it is secured in position by peening over the normally upstanding, integral flange 162a of the socket portion 162. The plug 166 includes a reduced diameter cylindrical portion 166a extending coaxially downwardly within the upper end portion 150 C of thimble 150, to a position about midway of the length of the spring fingers 160a, 160b, . . . and serves as a stop for the arrowhead 46a of an upwardly moving detector string 46.

Flow holes 168 are provided at the upper ends of the spring fingers 160a, 160b, and flow holes 169 are provided in the sidewall of the upper end portion 150c of the thimble 150, to permit the primary coolant fluid to flow through the thimble 150 and thereby move the detector string 40 upwardly through the thimble 150 and into its fully inserted portion, engaged by the latch 164. These same flow holes 168 and 169 permit the opposite direction of the flow of the coolant for withdrawing a detector string 40 from the latched position and driving same downwardly through the thimble 150, as later discussed.

Figure 7:
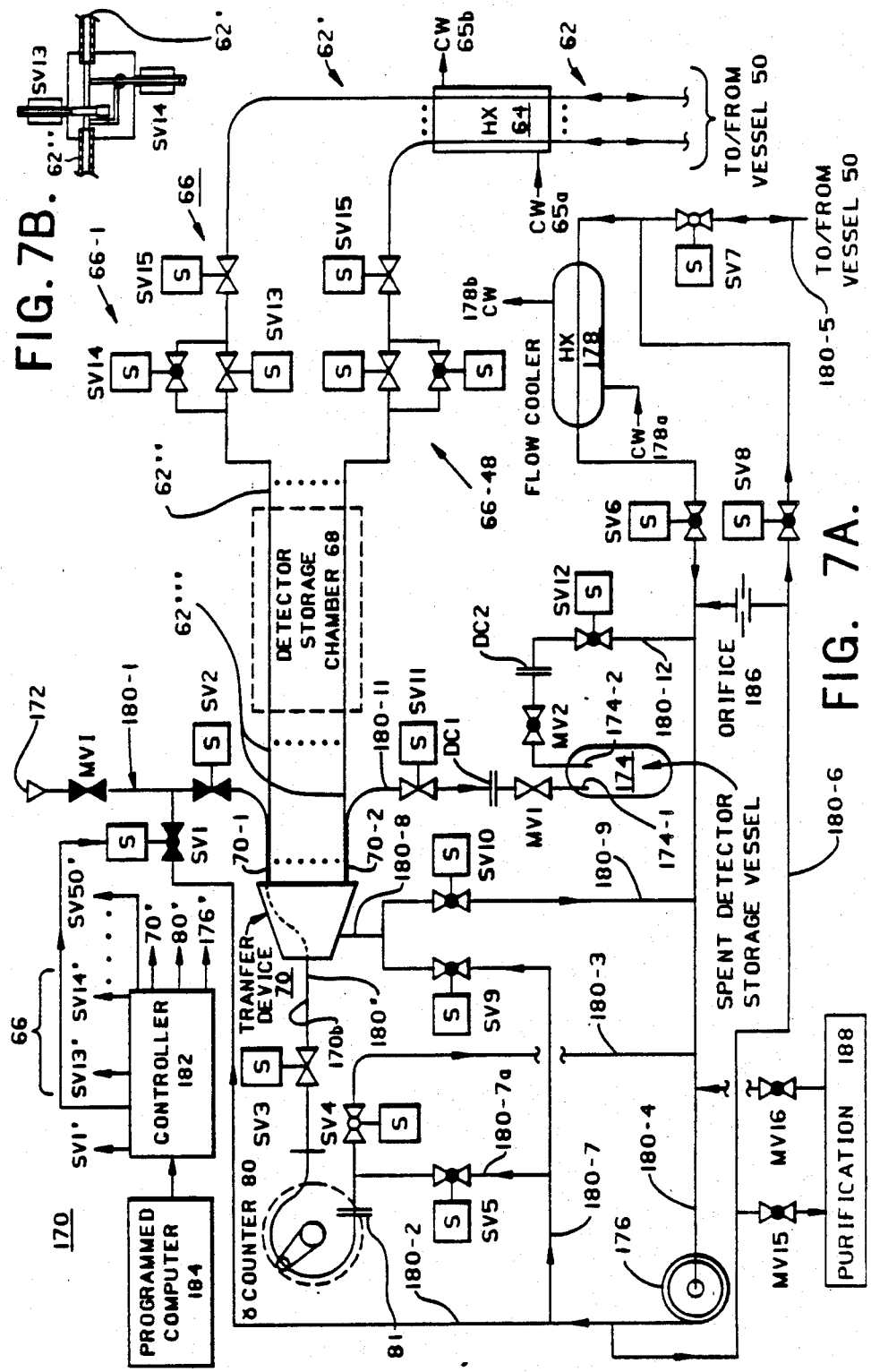
FIG. 7A is a schematic, partly in block diagram form, of a first embodiment of a detector string fluid transport and sensing system in accordance with the invention.
FIG. 7B is a schematic diagram of a representative valve assembly employed in the system of FIG. 7A.

FIG. 7A is a schematic block diagram of the fluid handling system 170 which generates the flow of primary coolant for selectively moving the detector strings for insertion into and withdrawal from the vessel 50 and for the handling, or transport, functions associated with the ICIS read-out room 49c as shown in FIG. 3. Components of FIG. 7A identical to those of FIG. 3 are identified by identical numerals. Thus, in FIG. 7A, tubes 62 pass through the head exchanger (HX) 64, tube portions 62' connect the latter to respectively associated valve systems 66, and tube portions 62'''connect the latter to respective storage positions in the chamber 68, and tube portions 62''' connect the latter to corresponding connection positions of the transfer device 70; as before noted, chamber 68 effectively comprises continuous tube segments extending between valves 66 and device 70, and thus encompasses the tube portions 62'' and 62'''.

Transfer device 70 includes a number of connection positions corresponding to the number of storage positions in chamber 68 and at least two additional positions. Position 70-1 is connected to the detector loading tube 180-1 and position 70-2 is connected to the spent detector string discharge tube 180-11, which in turn is coupled through the indicated valves and joints to the spent detector storage vessel 174. For the illustrative two (2) loop plant, device 70 further includes forty-eight (48) connection positions (i.e., 70-3 to 70-50) corresponding to tubes 62''' and may include a null position. As subsequently described in connection with FIG. 8, the transfer device 70 selectively connects each of the selectable connection positions 70-1, . . . 70-50, thereof to its common connection 70b, to enable selectively transporting each individual detector string 40 through tube 80'to and from the gamma counter 80. Device 70 also permits simultaneous transport of all detector strings, selectively from the chamber 68 to the vessel 50 and in reverse, for return to the chamber 68, as well as other functions, later explained. Details of the transfer device 70 and of the gamma counter 80 are shown in FIGS. 8 to 11, subsequently described.

Further components of the system of FIG. 7A include a detector string loading funnel 172, a vessel 174 for spent detector strings, a detector circulating pump 176 and a second heat exchanger (HX) 178 having secondary coolant inlet and outlet connections 178a and 178b, respectively. The components of the system 170 are connected by a series of internal tubes 180, specific ones thereof identified by the reference numerals 180-1, 180-2, . . . and several valves, as to which the following designations are adopted: "SV" designates remotely controlled solenoid actuated valves; "MD" designates manual valves; and "DC" designates disconnect joints. Controller 182 provides appropriate outputs for operation of the components of the system 170, under automated control from a programmed computer 184, in accordance with the required operations of the system 170 as now described.

To load a new detector string 40 (FIG. 2), MV1 is opened and the new detector string is inserted through the loading funnel 172 and into the loading tube 180-1. MV1 then is closed. Transfer device 70 is set to its corresponding position 70-1. (MV1 optionally could be a remotely controlled solenoid actuated valve "38".) SV1, SV2, SV3 and SV4 then are opened to permit pump 176 to produce a flow through tubes 180-2, 180-1, the transfer device 70, the counter 80, tube 180-3 and the return tube 180-4, thus completing the flow path back to pump 176. The new detector string is impelled, by the fluid flow, into counter 80 and comes to rest with its leading end at stop 81.

Transfer device 70 then is moved to its connection position corresponding to the position for the new detector string in chamber 68. Valve systems 66 are controlled so as to afford a bypass path for the flow of coolant while blocking progress of the detector strings out of the chamber 68 and toward the vessel 50, and thus for retaining the detector strings in the chamber 68. Particularly, vales SV14 are opened to provide the bypass path while valves SV13 are closed to block passage of the detectors 40. Valves SV15 are isolated valves, connected in line with the solenoid valves SV13, and are normally opened, to complete the fluid passage to vessel 50. Accordingly, valves SV1, SV2, and SV4 are closed and valves SV5, SV6 and SV7 are opened. (Valve SV7 optionally may be manually operated since it serves to provide isolation of system 170 from vessel 50. As shown, SV7 connects through tube 180-5 to the vessel 50 and permits bi-directional primary coolant flow between the vessel 50 and system 170. SV7 accordingly is normally open, during all transport operations of system 170.) SV6, when opened and with SV8 closed, permits a feed flow from vessel 50 through tube 180-5 to system 170, and particularly into the return line tube 180-4 to pump 176. (Conversely, SV8, when opened and with SV6 closed, connects the flow output of pump 176 through tube 180-6 to produce the opposite flow of coolant, i.e., from system 170 through tube 180-6 to vessel 50 and return to system 170.)

Accordingly, to transport the new detector string from counter 80 to its storage position in chamber 68, valves SV1, SV2 and SV4 are closed, SV3 remains open, and valves SV5 and SV6 are opened to permit a flow of coolant from vessel 50 through tube 180-5 and the return line 180-4 to the pump 176 and then through tubes 180-2, 180-7 and 180-7a to the counter 80. The fluid propels the detector string out of counter 80 and through transfer device 70 to the storage position in chamber 68. As noted, the corresponding valve system 66 is in the bypass/ blocking position, to complete the flow through the associated tubes 62'', 62', and 62 back to vessel 50, while retaining the detector string in its position in chamber 68.

When the detector storage chamber 68 is fully loaded with the requisite number of detector strings, they are transported simultaneously from chamber 68 through tubes 62'' and the valve systems 66, as now adjusted to their open, non-blocking positions, and thus through lines 62' and 62 to the vessel 50. To perform this function, valve SV6 is opened to supply primary coolant from vessel 50 through tubes 180-5 and 180-5 to the pump 176 and valve SV9 is opened to connect tube 180-7 through motive flow line tube 180-8 to transfer device 70. The motive flow is communicated within device 70 in parallel to all of the forty-eight (48) connection positions associated with the storage positions of the detector storage chamber 68, and simultaneously projects the detector strings through the tubes beforenoted to the vessel 50. (In this operation, valve SV10, connected between the motive flow line tube 180-8 and a return tube 180-9, is closed as is valve SV11, which is connected to the spent detector string discharge tube 180-11).

To withdraw the detector strings simultaneously and in parallel from vessel 50 and return them to system 170, valve systems 66 remain in their open, non-blocking positions, valve SV9 is closed and valve SV10 is opened to connect the motive flow line 180-8 through the return tubes 180-9 and 180-4 to the pump 176. Moreover, SV6 is closed and SV8 is opened for connecting the output of pump 176 through the exhaust flow tubes 180-6 and 180-5 to the vessel 50. Accordingly, the fluid flow from the vessel 50 passes in parallel through all of the tubes 62, 62' and 62'' and simultaneously transports the detector strings back into their positions in chamber 68. In this operation, transfer device 70 is placed in a null position, before-noted and later described in detail, which permits fluid flow through the guide tubes 62'' in parallel into the transfer device 70 and return tubes 180-9 and 180-4, but mechanically blocks the detector strings 40 at the positions 70-3 to 70-50. In this regard, it will be understood that the chamber 68 effectively extends to and includes the connections positions 70-2 through 70-50 of transfer device 70 and thus encompasses, as well, the tubes 62'''.

A further detector string transport operation of system 170 permits discharging spent detector tubes into the spent detector storage vessel 174. Disconnect joints DC1 and DC2 permit disconnecting the vessel 174 from system 170 when it is desired to remove spent detector strings therefrom and manual valves MV1 and MV2 permit sealing off the flow inlet 174-1 and flow output 174-2 of vessel 174. During normal operations, of course, vessel 174 is connected at joints DC1 and DC2 in the flow path and MV1 and MV2 are normally open. SV12 connects the outlet 174-2 of vessel 174 through return line tubes 180-12 and 180-4 to pump 176.

To perform the spent detector discharge operation, transfer device 70 is positioned at the connection position corresponding to the position of the spent detector string in chamber 68. SV3, SV4 and SV8 are opened thereby permitting pump 176 to produce a flow of coolant from the vessel 50 and through the associated position of chamber 68, device 70 and counter 80, and through SV4, tubes 180-3 and 180-4, the pump 176, the exhaust tube 180-6 and tube 180-5 to the vessel 50. The spent detector string accordingly moves into counter 80, advancing to stop 81. Transfer device 70 is then positioned at connection 70-2 to the spent detector discharge tube 180-11. Valve SV3 remains open valve SV4 is closed and valves SV5, SV11 and SV12 are opened, thereby completing a flow path through tubes 180-2 and 180-7a, counter 80, transfer device 70, and discharge tube 180-9 for transporting the spent detector string into vessel 174. The flow path is completed through outlet 174-2 of vessel 174, SV12, tube 180-12 and the return line tube 180-4 to pump 176. (Vessel 174 is filled fully with coolant and thus permits this closed loop operation.)

As noted in the above, the valve systems 66, associated with the detector storage positions of chamber 68 through the tubes 62", are selectively operable to retain the detectors in the storage positions in chamber 68, or to provide for transport of all the detector strings simultaneously between the chamber 68 and the vessel 50. Valve systems 66 may be operated individually, moreover, to open a selected in-line valve SV13 (and close the corresponding by-pass valve SV14), to transport an individual detector string to and from chamber 68 and vessel 50. As before noted, each valve system 66 includes an in-line valve SV13 and a bypass valve SV14, as more readily seen in FIG. 7B. Valve SV15 is in-line and functions as an isolation valve (i.e., as is SV7), and thus may be a manually operated valve ("MV") instead. Accordingly, valve SV15 is normally open during operation of system 170 and the control functions are afforded by valves SV11 and SV12. Transport of a detector through a valve system 66 and thus between tubes 62' and 62", in either direction, requires that SV13 be open and SV14 be closed. Conversely, where a detector string is to be retained in chamber 68 but a fluid flow through chamber 68 to the vessel 50 is required, in-line valve SV13 is closed and bypass valve SV14 is opened. As readily visualized from FIG. 7B, the closed valve SV13 provides a mechanical stop for retaining of the detector string while the necessary fluid flow passes through the bypass path of valve SV14. (It thus will be understood that chamber 68 effectively extends to the valves SV14 and the tubes 62" are within chamber 68.)

Heat exchanger 178 provides for cooling the supply flow from vessel 50 passing through tube 180-5 and then through SV6 and return line tube 180-4 to pump 176, and etc., as explained earlier with regard to heat exchanger 64.

Orifice 186 interconnects tubes 180-4 and 180-6 to provide a minimum pump flow bypass in the event that all flow paths within system 170 are closed, thus avoiding potentially harmful "shut-off" pump operations.

MV15 and MV16 are selectively operable to connect tubes 180-6 and 180-4 to a coolant purification system 188; the purification system 188, as is known and conventional, insures that proper reactor grade water coolant chemistry is maintained, thereby to avoid injection of impurities into the reactor vessel 50. Suitable filters, demineralizers, and pumps of the purification system 188 are employed for this purpose. The water chemistry of system 170 is established before a run and cleaned up after a run, as well, by the system 188. During actual operations of system 170, however, valves MV 15 and MV 16 are closed, to cutoff the bypass connection.

Programmed computer 184 provides for the necessary coordinated actuation of the SV valves through controller 182 which provides corresponding outputs to those valves. In this regard, each of the forty-eight (48) valve systems 66 is provided with its respectively responding outputs SV13' and SV14'. The same is true as to valves SV15, if they are solenoid actuated rather than manually actuated. Controller 182 also provides for actuation of transfer device 70 and for driving the counter 80 in its sensing operations, both as later described, and for driving the circulating pump 176, as indicated by outputs 70', 80' and 176'.

Figure 8:
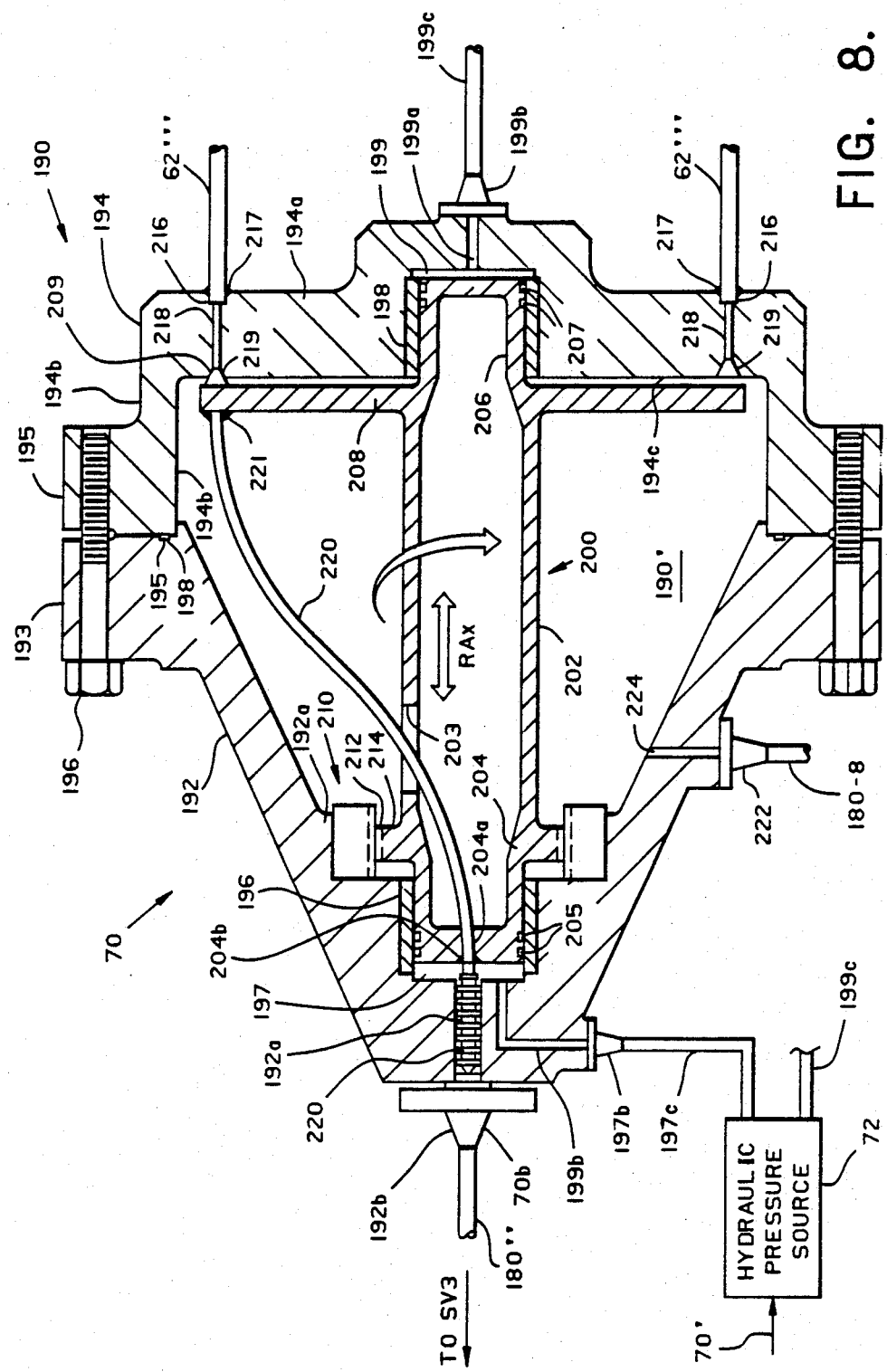
FIG. 8 is an elevational and cross-sectional, simplified view of a detector string transfer device in accordance with the invention.

FIG. 8 is an elevational and cross-sectional, partially broken-away and schematic, view of the transfer device 70 including its connection positions to tubes 62''', and its common connection through tube 180' to valve SV3, as seen in FIG. 7A. Casing 190 is formed of two major components, a cone 192 having an annular flange 193 and a cap 194 of generally cylindrical configuration having a solid end wall 194a, a cylindrical sidewall 194b, and an annular flange 195. The flanges 193 and 195 are appropriately bored and threaded for being secured together by a plurality of bolts 196 about their mating peripheries, one such bolt 196 being shown in FIG. 8. O rings 198 received in corresponding grooved recesses 195 in the flat surface of flange 193 provide a pressure seal with respect to the interior chamber 190' of the casing 190.

Rotor 200 includes an elongated shaft 202 which may be of any desired cross-sectional configuration, e.g., either a hollow cylinder or two or more elongated support rods, and interconnects a pair of pistons 204 and 206 at its opposite ends. Bearings 196 and 198 are mounted in axially aligned relationship in the forward end of cone 192 and the central portion of the solid end wall 194a of cap 194, respectively, within which the respective pistons 204 and 206 are received. Piston rings 205 and 207 seal against the bearings 196 and 198, respectively, yet permit both axial reciprocating and rotary movement of the pistons 204 and 206. Pistons 204 and 206 and their associated bearings 196 and 198, define corresponding chambers 197 and 199 which respectively communicate through passageways 197a and 199a to external hydraulic fittings 197b and 199b, respectively.

Hydraulic lines 197c and 199c are connected to a hydraulic pressure source 72 which receives the control signal 70' from the controller 182 (FIG. 7A). The control signal 70' causes the hydraulic pressure source 72 to direct pressurized hydraulic fluid into a selected one of the chambers 197 and 199 and simultaneously to vent the other chamber, thereby to drive the rotor 200 in corresponding and oppositely directed, or reciprocating, axial directions relative to the casing 190. A rotation ratchet 210 mounted on an internal annular flange 192a of the cone 192 engages a toothed surface 212 of the collar 214, which is formed integrally with and extends radially from the shaft 202 adjacent the piston 204, whereby each cycle of the reciprocating axial movement of the rotor 200 (see arrow "RAX") causes the rotor to step through a predetermined annular displacement in a fixed direction of rotation (see arrow "ROT").

The solid end wall 194a of the cap 194 includes a number of sockets 216 corresponding to the number of connection positions for tubes 62''', the detector string loading tube 180-1 and the detector discharge tube 180-12, a null position, and any other required positions. The sockets 216 are displaced at equiangular positions at a fixed radius about the axis of rotor 200, corresponding to the angular segment stepping function of the rotation ratchet 210. Tubes 62''', 180-1, 180-12 are received in respective sockets 216 and secured in position as indicated by weld lines 217. Bored passageways 218 extend in parallel axial relation from each socket 216 to the interior, generally flat surface 194c of the cap 194. Female cone connectors 219 are formed in the surface 194c by counter boring that surface in alignment with the respective, bored passageways 218. Annular plate 208 of the rotor 200 includes a single male cone connector 209 which is received in loosely sealed engagement by the female cone connector 219 at each angular stepped position of the rotor 200. The reciprocating axial movement of rotor 200 withdraws the male cone connector 209 from a given female cone connector 219, prior to the angular step rotation of the rotor 200 into aligned position with the next successive female cone seat 219. Tube 220, which may be similar to the tubes 62''', is affixed to the plate 208, as indicated by weld line 221, and is in communication with a passageway extending through the plate 208 and the male cone connector 209. Tube 220 extends through a gently curved path, passing through an opening 203 in the shaft 202 of rotor 200 and a central axial bore 204a in the end wall of piston 204 and is secured thereto as indicated by weld line 204b. The remaining, free end of tube 220 is encased in a rotary seal 220 received within a central bore 192a in the cone 192, and the base 192a is sealed by an external connector seal 192b, the latter together comprising the common connection 70b. Tube 180' is joined by the external seal 192b to the common connection 70b of transfer device 70 and to valve SV3 which in turn is connected to a sealed internal passageway of the counter 80, to be described. Finally, the motive flow tube 180-8 is connected by an external connector seal 222 to and through radial passageway 224 to the interior 190' of the casing 190.

As will be appreciated, the rotor 200 is stepped through the successive angular displacements by the successive cycles of reciprocating axial movements to thus come into selective and successive sealed communication with each of the tubes connected to the cap 194. Further, when rotor 20 is stepped to position the male cone connector 209 at a null position, or at least to a position unassociated with any of the tubes 62''', all of the corresponding female cone connectors 219 are exposed to the interior chamber 190' of the casing 190. When primary coolant is introduced into that interior chamber 190' through the motive flow line tube 180-8, or withdrawn therefrom through that same tube 180-8, the detector strings simultaneously are transported from the detector string storage positions of chamber 68 to the instrumentation thimbles 150 of the vessel 50, or in the reverse direction, respectively.

Figure 9:
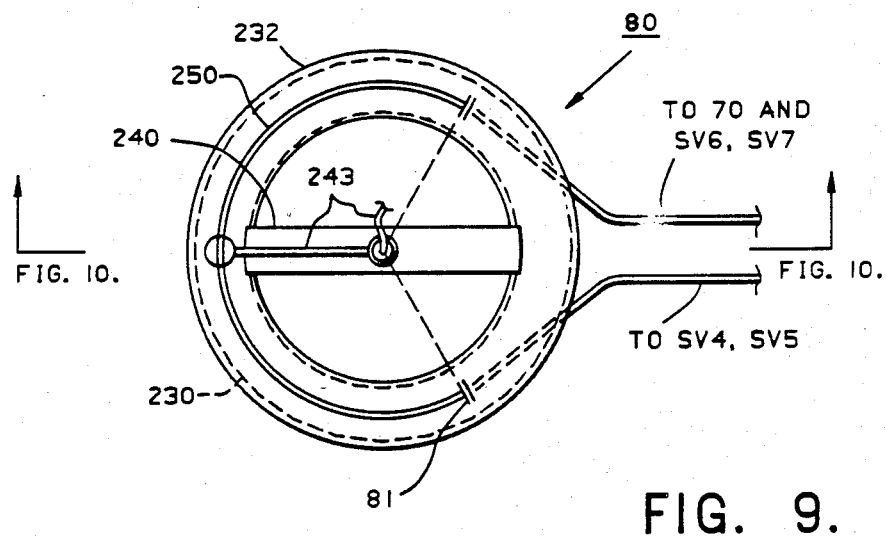
FIG. 9, 10 and 11 are simplified and schematic, top plan, elevational, and cross-sectional views of a gamma counter device in accordance with the present invention, each of FIGS. 10 and 11 being taken in a plane along the line of 10,11 - 10,11 in FIG. 9.
Figure 10:
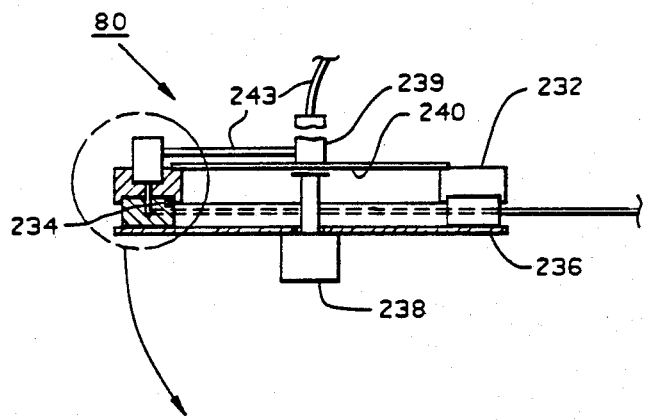
Figure 11:
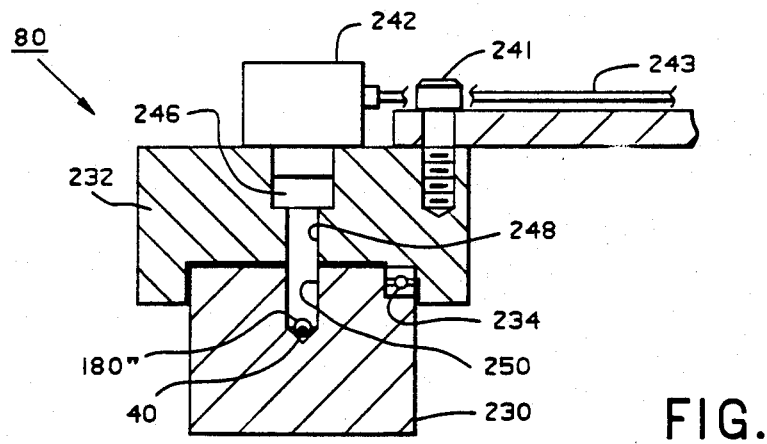

The gamma counter 80 of FIG. 3 is shown in FIGS. 9, 10 and 11, FIG. 9 being a simplified and plan view, FIG. 10 being a simplified and cross-sectional elevational view, and FIG. 11 being an enlarged and fragmentary, elevational and cross-sectional view, each of FIGS. 10 and 11 being taken in a plane along the line 10,11 - 10,11 in FIG. 9. The gamma counter 80 is of a generally circular configuration and comprises an annular base 230 and an annular cover 232 having an underlying annular recess by which it is received over the base 230 and supported thereon for relative rotational movement by a bearing race 234. The base 230 is secured to a support 236 on which is mounted a motor 238. The motor shaft 239 extends coaxially relative to the annular base 230 and cover 232 and carries a drive arm 240 connected at its opposite ends to the rotary cover 232, as shown by bolt 241.

A gamma counter 242 is mounted on the annular cover 232 such that its detector crystal 246 is disposed over a slit window 248 in cover 232. The slit window 248 aligns with an annular slit channel 250 in the annular base 230, at the lower end of which is received a high pressure tube 180'' which in turn is connected to the internal tubing 180 of the control system 170, as before described.

A detector string 40 is moved into the gamma detector 80 as described in connection with FIG. 7A and, in relation to FIGS. 9, 10 and 11, will be understood to form into an arcuate segment comprising approximately 270° of a circle, the leading end abutting the detector stop 81. Motor 238 then is energized to drive the gamma counter 242 through the 270° and derive the required measurements by reading of the detector balls by the crystal sensor 246, a small segment at a time, through the slit 248. The cable 243 connects the gamma counter to appropriate circuitry for processing the sensed outputs. If desired, plural detectors and corresponding slits may be employed. It will be understood that the base and cover 230 and 232 are appropriately shielded to prevent any radiation exposure and reduce the background radiation to which the counter is subjected, and which would degrade readout accuracy.

From the foregoing, it will be appreciated that the hydro-ball in-core instrumentation system of the present invention in accordance with the first embodiment thereof hereinabove disclosed affords numerous advantages over the prior art, significantly complying with the specified characteristics of an ideal such system. Substantially all operating functions may be remotely controlled thus affording minimum potential exposure of personnel to radiation. Significant size reductions are achieved, providing both reductions in costs for the instrumentation system and an even more significant reduction in the size and thus cost of the containment structure for a given pressure vessel, afforded primarily due to the high degree of flexibility of the detector strings. The capability of simultaneous insertion and withdrawal of the detector strings moreover contributes to improved accuracy of the data sensing and thus of the resultant mapping. Significantly, by virtue of the bottom penetration configuration, neither disconnection nor movement of the instrumentation thimbles 150 is required during refueling and maintenance operations. A highly significant feature is that the tubing and related structures defining internal passageways for the detector strings are maintained at the same pressure as the primary coolant within the vessel; as a result, simple slip fit or face contact connections suffice, enabling substantial simplification of the disassembly and/or reassembly of the components defining the detector string passageways within the vessel and thus minimizing the time and effort required for performing maintenance and refueling operations. Thus, both the down time during power outages and the extend and duration of potential exposure of personnel to radiation are minimized.

The second embodiment of the instrumentation system of the invention, shown generally in FIG. 4B, employs top head penetration of the pressure vessel and thus permits complete elimination of the need for any spacing below the bottom of the pressure vessel, for example the space 49a shown in FIG. 3. This enables a further reduction in the corresponding size requirements of the containment structure 48. The elimination of the bottom penetrations moreover reduces the consequences and recovery problems of a core melt-down and bottom penetration LOCA's. As will be seen in the following detailed description, the top head penetration embodiment does not require a detector string positioning latch inside the fuel assembly instrument thimble. On the other hand, the top head penetration increases the complexity of the vessel head package and does require disconnection of several guide tube jumper bundles which run between the vessel head instrumentation columns and the refueling cavity wall. While additional complexity is introduced in the head region and upper internals because of the head penetration, the common feature of both embodiments that the detector string passageways are maintained throughout at the internal pressure of the vessel again permits use of simple slit fit or face contact connections, affording similar simplification of the assembly and disassembly operations of the instrumentation components in conjunction with performing refueling and other maintenance operations within the vessel.

A single head penetration assembly 300 is illustrated in FIG. 4B, which accommodates twelve (12) passageways for a corresponding twelve (12) detectors of the type 40 of FIG. 2. For the same illustrative example of a two loop plant, requiring forty-eight (48) detectors, there would thus be four head penetration assemblies 300 equiangularly disposed about the head 58 to provide for an efficient disbursement of the individual guide tubes 304 within the upper head region 50a, as more fully explained hereinafter. For the illustrated head penetration assembly 300 of FIG. 4B, there are thus, illustratively, twelve (12) guide tubes 304 grouped within the detector head column 306. The head column 306 is supported at its lower end by a bracket 308 mounted on the upper support plate 104 and passes upwardly through a head penetration 310, the upper end 306a of the head column 306 protruding above the upper end of the head penetration 310 and being joined by a flanged disconnect joint 312 to the jumper bundle 302. A second flanged disconnect joint 314 is mounted on a support wall 48 and serves to join the individual tubes within the bundle 302 to the respective tubes 62a which are shown, schematically, to extend from the flanged disconnect 314 and through the wall 48. In an actual installation, as schematically illustrated in FIG. 3, the tubes 62a would extend through the containment wall 48 which separates the vessel 50 from the ICIS readout room 49d at the height relative to the vessel head 58 as indicated in FIG. 4B, and through a similarly relocated heat exchanger (affording the function of HX64 in FIG. 3) to the solenoid valve systems 66 and the storage chamber 68 substantially as shown in FIG. 3. The remainder of the in-core instrumentation system of this second embodiment may be identical to that of the first embodiment as described above.

Figures 12, 13:
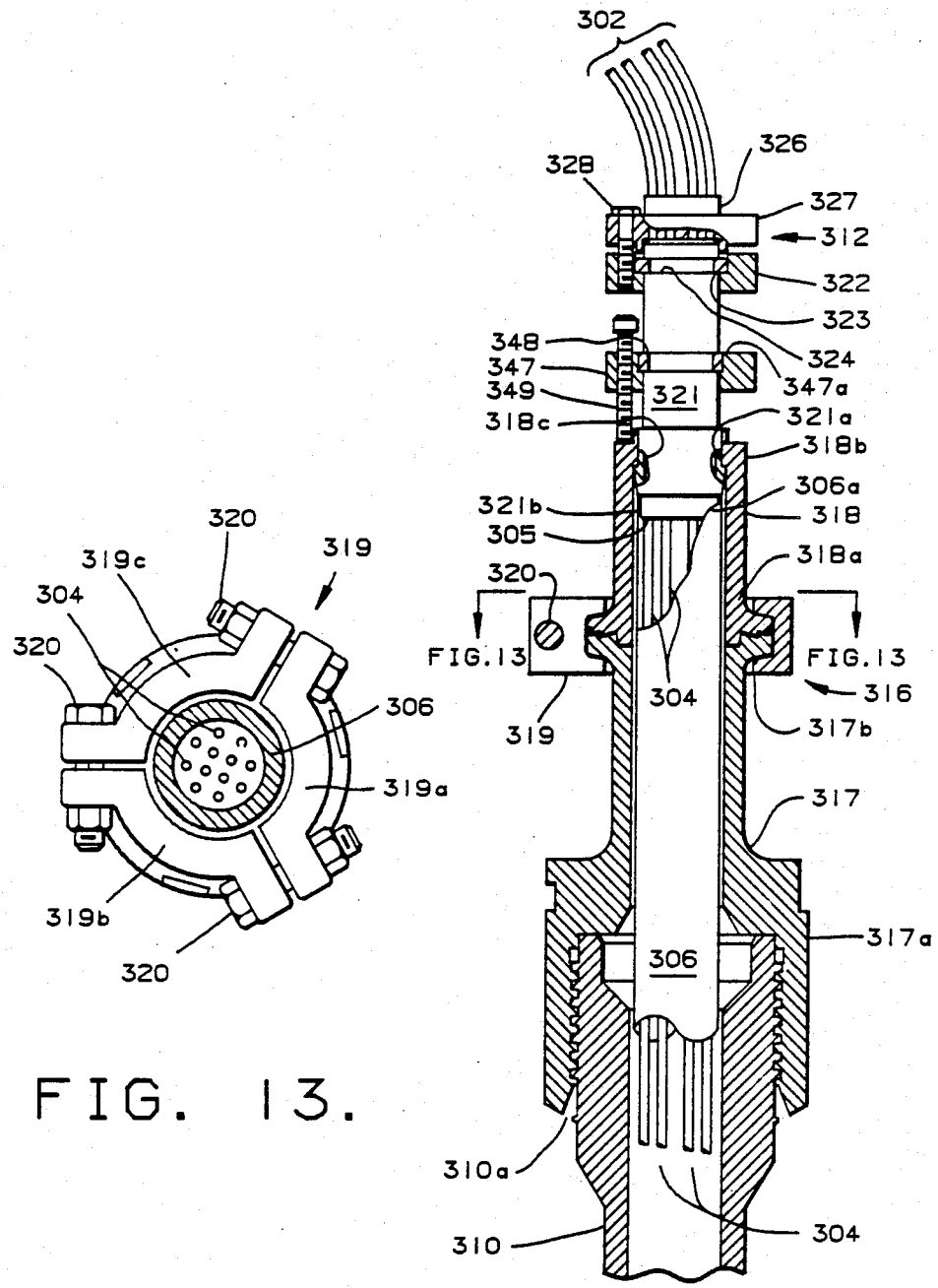
FIG. 12 is a fragmentary, cross-sectional and elevational view of a disconnectable joint assembly and a flanged disconnect joint employed in the top head penetration embodiment of the present invention and comprising a fragmentary portion of the structure shown in FIG. 4B.
FIG. 13 is a cross-sectional view taken in a plane along line 13—13 in FIG. 12.

FIG. 12 is an elevational, cross-sectional view, partially broken-away and partially schematic, of an upper extremity of the head penetration 310 also shown in FIG. 4B, and of a coupling assembly 316 which joins the head column 306 containing the twelve (12) tubes 304 to the flanged disconnect joint 312. More specifically, as seen in FIG. 12, coupling assembly 316 includes lower and upper sections 317 and 318 which are interconnected by a selectively releasable clamp joint 318, so as to be relatively rotatable. The enlarged diameter and interiorly threaded lower end 317a of the lower section 317 is received in threaded engagement on the exteriorly threaded upper end 310a of the head penetration 310. The flanged upper end 317b of the lower section 317 preferably is machined to define stepped grooves which mate with corresponding stepped grooves in the flanged lower end 318a of the upper section 318, thus permitting relative rotation while maintaining axial alignment thereof. A seal (not shown) is received between the abutted and mating, grooved surfaces. Ring clamp 319 is fitted about the flanges 318a and 381b and tightly secured by bolts 320, schematically illustrated in FIG. 12, to secure the upper and lower parts 317 and 318 of the coupling assembly 316 against relative axial or rotational movement. As better seen in FIG. 13, a cross-sectional view taken in a plane along the line 13—13 and transverse to the axis of the coupling assembly 316, ring clamp 319 may comprise three (3) roughly 60° angled sections 319a, 319b and 319c having corresponding radial flanges which are suitably apertured and threaded to receive respective bolts 320.

The upper end 306a of the head column 306 is secured (as late detailed in reference to FIG. 14) to the lower end of a face contact plug 321, a component of the joint 312. The upper end 318b of the upper section 318 includes a reduced diameter collar 318c which is received about a mating, reduced diameter neck portion 321a of the plug 321 and sealed thereto by ring seal 321b. The seal is maintained by a jack-type ring clamp 347 which, as seen in the cross-sectional view of FIG. 12, includes an internal, annular groove 347a which receives a split lock ring 348, the latter seated in an annular groove 321a in the plug 321. Screws 349, typically three (3) in number (but only one of which is seen in FIG. 12), are received in threaded engagement through the ring clamp 347 and bear against the flat, upper end 318b of the upper part 318 of the coupling assembly 316. By tightening the screw(s) 349, the ring clamp 347 imposes an upward axial force on the plug 321, compressing the ring seal 321a and thus completing the fluid-tight connection of the coupling assembly 316 and particularly between the plug 321 and associated head column 306 and the head penetration 310.

Flanged disconnect joint 312 comprises face contact plugs 321 and 326. Plug 321 includes an annular collar 322 which is received over a split lock ring 323, in turn received in a mating annular recess 324 adjacent the upper end of the plug 321. Plug 326 has an integral annular collar 327. Plural bolts 328, of which one is shown in FIG. 12, are inserted through suitable apertures in the collar 327 and received in threaded engagement in corresponding threaded holes in the annular collar 322, to secure the flanged disconnect joint 312.

Figure 14:
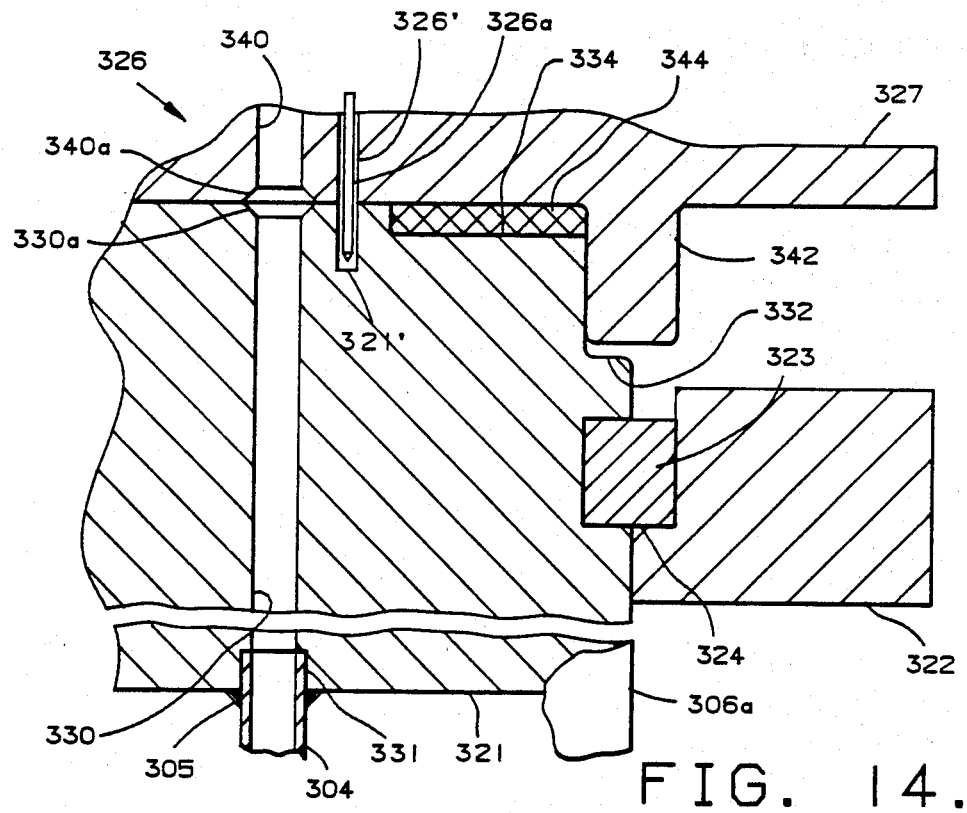
FIG. 14 is a fragmentary section of the flanged disconnect joint of FIG. 12.

FIG. 14 is a fragmentary and more detailed cross-sectional view of the interface portion of the components of the flanged disconnect joint 312. The upper end 306a (shown in fragmentary section) is suitably joined to the lower end of plug 321, about its outer circumference. Plug 321 includes an interior bore 330 which is counterbored at 331 to receive an end of a tube 304, the latter secured thereto such as by weld bead or brazed joint 305, for each of the twelve (12) tubes 304 (see FIG. 9). As will be appreciated from the broken-away illustration of plug 321 in FIG. 14, the plug 321 is of substantial axial length, extending from its bottom end within the upper part 318 of the coupling assembly 316 of the interface with plug 326 of the common joint 312, as seen in FIG. 12. The upper plug 326 includes bore 340, axially aligned with the bores 330 of the lower plug 321, to which corresponding tubes of the bundle 302 are secured, in like fashion as the tubes 304 and plug 321. The mating ends of the bores 330 and 340 preferably are counterbored as shown at 330a and 340a to assure that an adequate interface defining the required passage therethrough is afforded. Proper axial engagement of the plugs 321 and 326 is assured by the cylindrical socket 332 of plug 330 which receives annular ring 342 of plug 326. Bore 326' extends through plug 326 and by rotation of plug 326 is brought into alignment with bore 321' in plug 321, alignment pin 326a being inserted through the aligned bores 321' and 326' to establish proper rotary alignment of the plugs 321 and 326. An annular seal 344 is received in a corresponding annular recess 334 of plug 321, and may be either a metal "O" ring or a flexitallic gasket.

It is significant to the invention that the flanged disconnect 312 may be so constructed, in the sense that the individual passageways defined by the twelve (12) pairs of respective, aligned bores 330 and 340 need not be more critically sealed and instead that only the perimeter of the flanged disconnect joint 312 need be sealed against the full primary coolant pressure. Specifically, pressure differentials between the guide tubes and thus between the aligned sets of bores 330, 340 are very small, some cross-leakage is tolerable, and the seal afforded by the finished metal, face contact surfaces of plugs 321 and 326 with the matched, aligned holes are adequate. Joint 314 (FIG. 4B) may be identical to joint 312. It thus will be understood that the flanged disconnect joint 312, and joint 314 which may be identical thereto, permit easy disconnection and removal of the jumper bundle 302 during maintenance and refueling operations, and subsequent, easy reconnection during reassembly.

Disassembly then proceeds by disconnecting joint 312 and removing split ring 323 and collar 322. The jack-type ring clamp 347 then is released by loosening screw(s) 349, and the split ring 348 and ring clamp 347 then are removed. The head 58 now may be raised, with the head penetration 310 sliding in telescoping or coaxial relationship along the head column 306, which remains supported by bracket 308 on the support plate 104. The latter arrangement will be understood more clearly from FIG. 15, now described.

Figure 15:
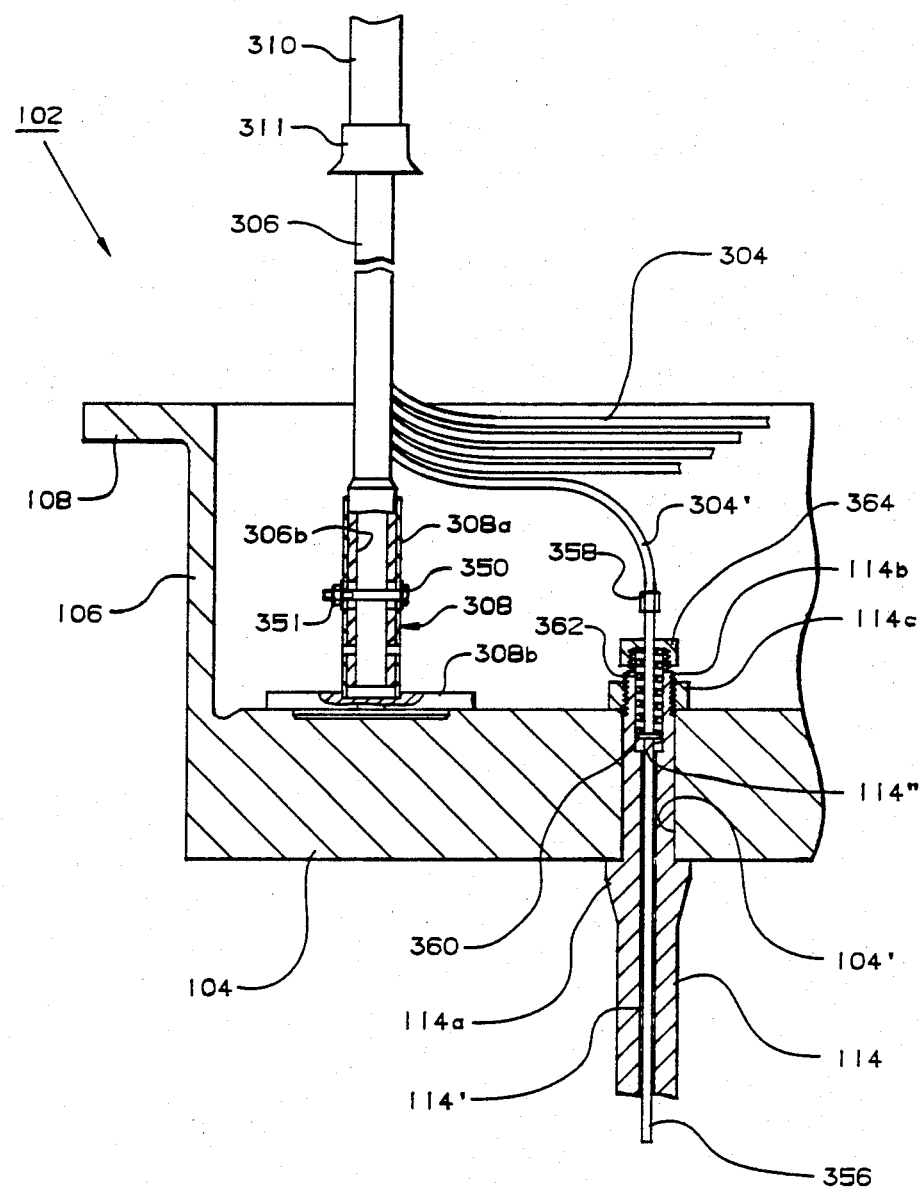
FIG. 15 is a fragmentary section of a support plate and associated upper internals support column and an illustrative head penetration column employed in the upper head region and the upper internals of the reactor vessel of FIG. 4B in accordance with the upper head penetration embodiment of the invention.

FIG. 15 is a fragmentary and cross-sectional elevational view, on an enlarged scale, of the head column 306, support plate 104 and associated structures within the head region 50a. Particularly, head column 306 extends downwardly from the head penetration 310, the lower end of which terminates in a bell shaped end connector 311 to facilitate aligning the column 306 therein during reassembly of the head. As seen in FIG. 15, bracket 308 may comprise an upstanding cylindrical sleeve 308a which receives a lower end 306b of the generally cylindrical column 306, a bore through a common diameter thereof receiving a bolt 350 and the bolt 350 and a nut 351 securing the same together. The lower end of sleeve 308a may be welded to a base plate 308b which in turn may be bolted (not shown) to the support plate 104.

As before described, the detector guide tubes 304 exit through an opening in the sidewall of the column 306 and are dispersed to appropriate positions from which they pass through very small radius bends, as illustrated for the tube 304', to turn to a vertical axial orientation in alignment with an instrumentation thimble in an associated fuel assembly, as now described.

Figures 16, 17:
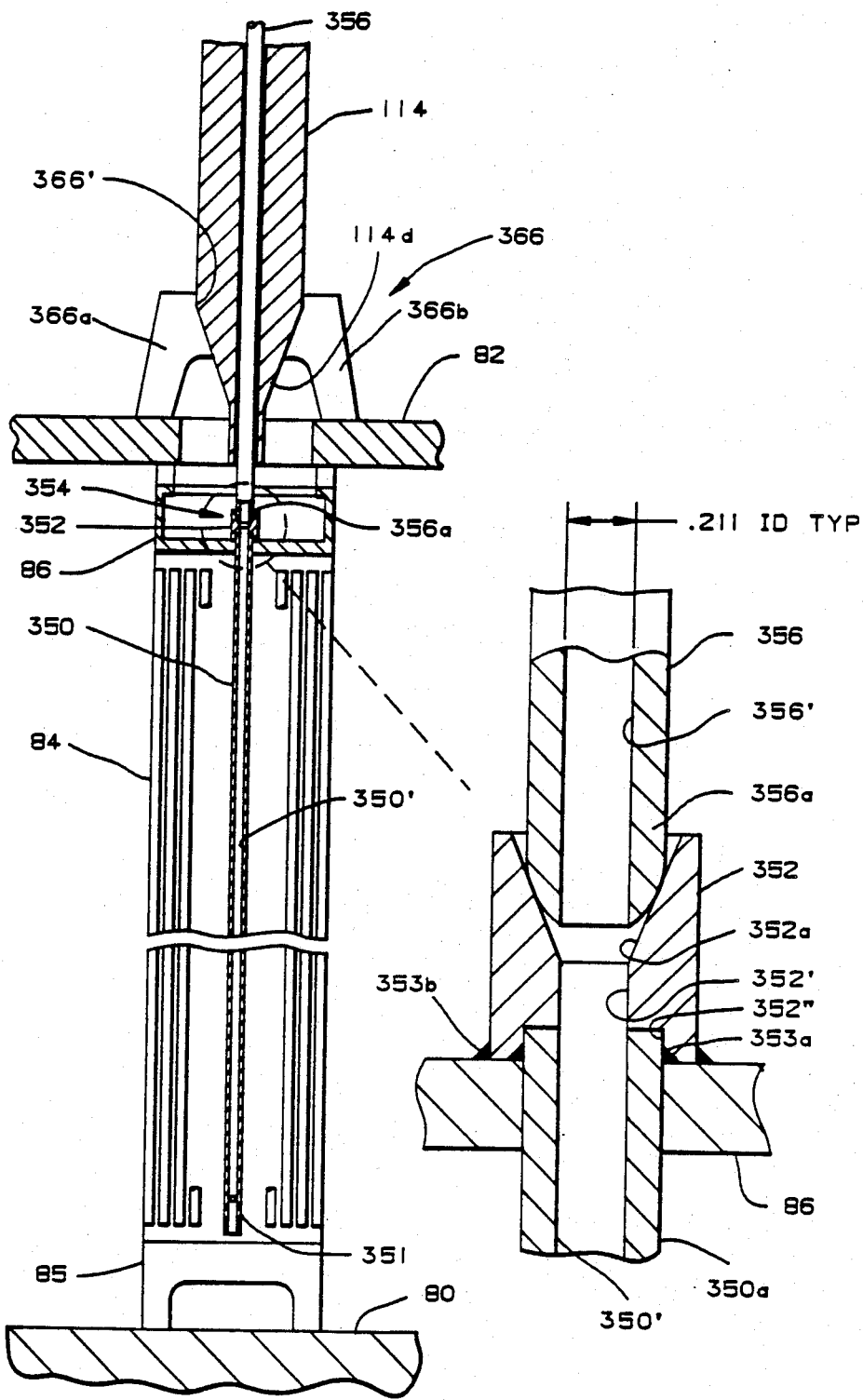
FIG. 16 is a fragmentary view, on an enlarged scale, of the fuel assembly and instrumentation thimble and an associated upper internals support column as employed in the lower and upper internals of the vessel of FIG. 4B in accordance with the top head penetration embodiment of the invention.
FIG. 17 is a fragmentary section, on an enlarged scale, of the ball and cone seal connection to the instrumentation thimble shown in FIG. 16.

Concurrent reference is now had to FIGS. 15, 16 and 17; FIG. 16 is a partially broken-away cross-sectional elevational view of a portion of the upper and lower internals 50b and 50c of the vessel 50 of FIG. 4B, and FIG. 17 is a fragmentary portion of FIG. 16, on an enlarged scale.

An upper internal support column 114 extends between the upper support plate 104 (FIG. 15) and the upper core plate 82 (FIG. 16) and defines an internal passage 114'. The column 114 further includes an annular collar 114a which abuts the lower surface of the upper support plate 104 and an upper end portion 104a which extends through an aperture 104' in plate 104 and protrudes above the upper surface of plate 104. The protruding portion is threaded on its outer surface for receiving a nut 114c which secures it to the support plate 104.

Column guide tube 356 extends coaxially through the interior 114' of the column 114 and extends vertically above the upper support plate 104 for connection to the guide tube 304' by a swage-lock fitting 358. Collar 360 is affixed to the column tube 356 and is received for sliding movement within the enlarged bore 114" in the upper end of the support column 114. Coil spring 362 is received in the enlarged bore 114' and extends between the collar 360 and a cap 364 which is threadingly received on the uppermost end of the column 114. Coil spring 362 thus resiliently biases the column tube 356 in a downward direction, urging collar 360 against the lower extremity of the bore 114", for a reason to be explained.

With reference to FIG. 16, the lower end 114d of the column 114 is conical in shape, or tapered, facilitating its alignment into and insertion through a correspondingly configured central opening 366' in a lower support bracket 366 which comprises radial legs 366a, 366b, . . . which are welded to the column 114 and supported on and affixed to the upper core plate 82, such as by bolts (not shown). The open-leg configuration facilitates passage of coolant flow through the associated opening 82' in the upper core plate 82.

The fuel rod assembly 84 (FIG. 16) is mounted by nozzles 85 and 86 at its lower and upper ends to the lower and upper core plates 80 and 82, respectively, as before described. Instrumentation thimble 350 extends axially and centrally, substantially throughout the full height of the fuel element assembly 84; it is secured within the upper bracket 86 by a stub 352 which forms, at its upper end, the female portion of a ball and cone seal affording a detachable connection 354 (which may be identical to the connection 141, before described).

As better seen in FIG. 17, the upper end 350a of the instrumentation thimble 350 extends through a suitable opening in the upper fuel assembly nozzle 86 and within a corresponding counterbore 352" of the stub 352 and is secured thereto as indicated by weld bead 353a or other means such as brazing or roll expansion. The stub 352 is secured to the nozzle 86 in like fashion, as shown at 353b. The interior 352' of the stub 352 again corresponds in diameter to that of the interior 350' of the thimble 350 and the interior 356' of the column tube 356. The female cone seat at the upper end 352a of stub 352, which receives the male ball end 356a of the column tube 356, likewise is more readily seen in FIG. 17. Thimble 350 includes flow holes 351 at its lower end providing for coolant flow either into or out of the interior passageway 350' of the thimble 350, which flow provides for the detector string movement as described previously.

It now will be appreciated that the upper internals 50b comprises, in normally assembled relationship, the upper core plate 104, the plural upper internals support columns 114 with the respective support brackets 366 bolted to the upper core plate 82 and thus the upper core plate 82 as well, to the column guide tubes 356 therein (FIGS. 15 and 16) as well as the head penetration columns 306 and the respective detector guide tubes 304 of each thereof.

In the reassembly of the vessel 50, such as following refueling or other normal maintenance operations, this normally assembled package of the upper internals 50b is lowered, maintaining the upper internals support columns 114 aligned with the corresponding fuel element assemblies 84. As the upper core plate 82 reaches its rest position, the ball and cone detachable connections 354 are completed, as shown in FIGS. 16 and 17, the coil spring 362 (FIG. 15) affording a resilient force for that purpose. Head 58, with the head penetrations 310 aligned with the respective head columns 306, then is lowered, the bell shaped ends 311 of the head penetrations 310 facilitating alignment of the upper ends of the head penetration columns 306 such that they pass through the respective head penetrations 310 and achieve the assembled relationship shown in FIG. 4B. The guide tube jumper bundle 302 then is installed, through use of the flanged connect joints 312 and 314, to complete the assembly operations relating to the instrumentation system.

It thus will be apparent that an extremely simplified assembly and disassembly operation is afforded by the head penetration embodiment of the present invention. Again, the feature that the detector string interior passageways are maintained at the internal pressure of the vessel 50 enables the use of relatively loosely-sealed joint structures at all interface connections of the detector string interior passageways within the interior of the assembly and disassembly operations.

Figure 18:
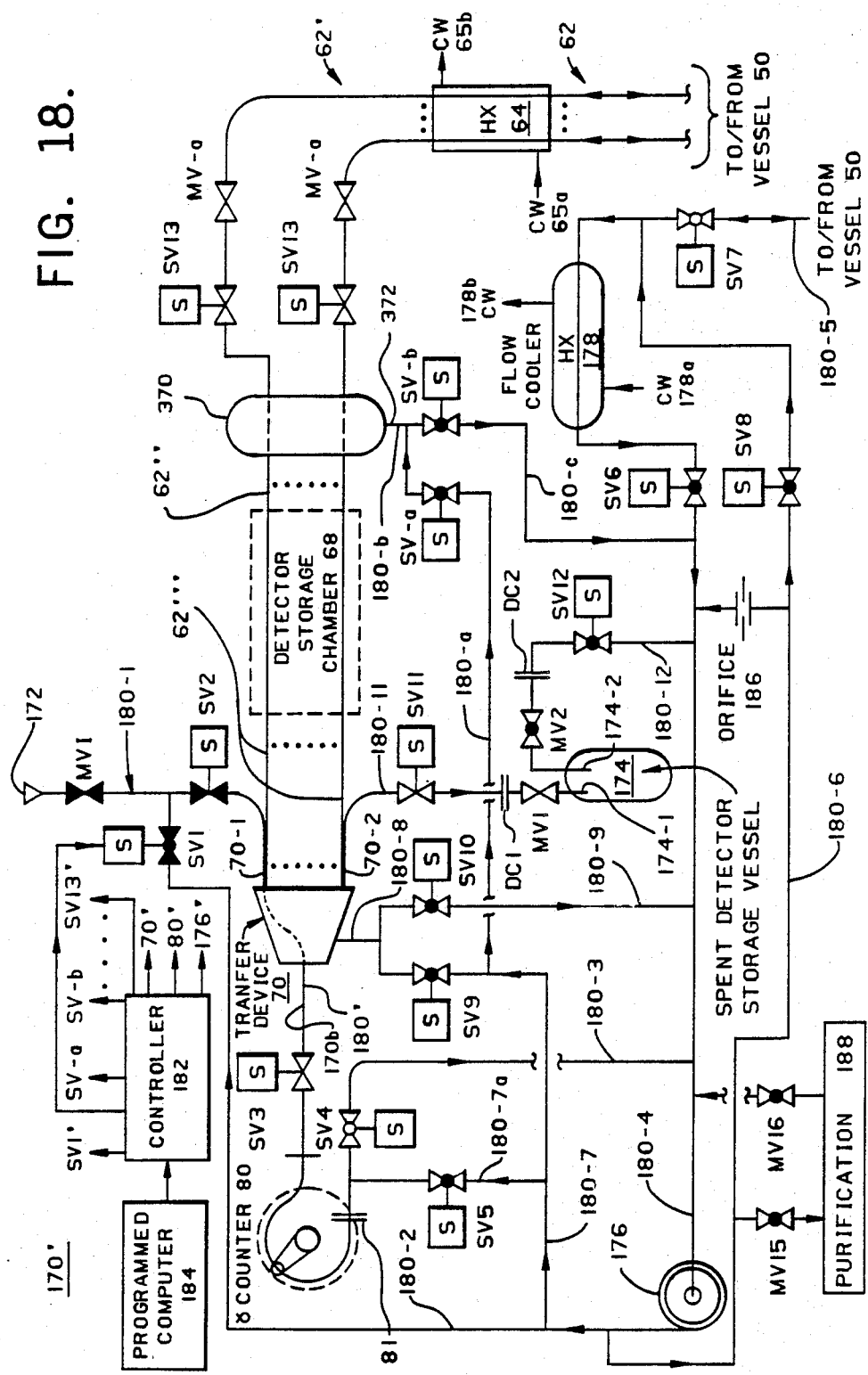
FIG. 18 is a schematic, partly in block diagram form, of a second embodiment of the detector string fluid transport system of the invention.

FIG. 18 is a schematic of a fluid handling system 170' comprising an alternative embodiment of the system 170 of FIG. 7A, identical parts being identified by identical numerals. Advantages afforded by the system 170' of FIG. 18 are that a substantial number of valves are eliminated and that the amount of reactor coolant which actually enters the system 170' is substantially reduced, thus reducing a major source of contamination and clogging of the narrow passageways in the detector string handling devices and tubes of the system, relative to that of FIG. 7A. Particularly, a propulsion flow header 370 is employed in the system 170' in lieu of the bypass solenoid valves SV4 of the forty-eight (48) valve systems 66 of FIG. 7A. In FIG. 18, manual isolation valves MVa are connected in the respective tubes 62' and serve the corresponding isolation purposes as the valves SV15 in the system of FIG. 7A; the valves MVa accordingly may be either manual, as shown, or solenoid controlled ("SV").

Figure 19:
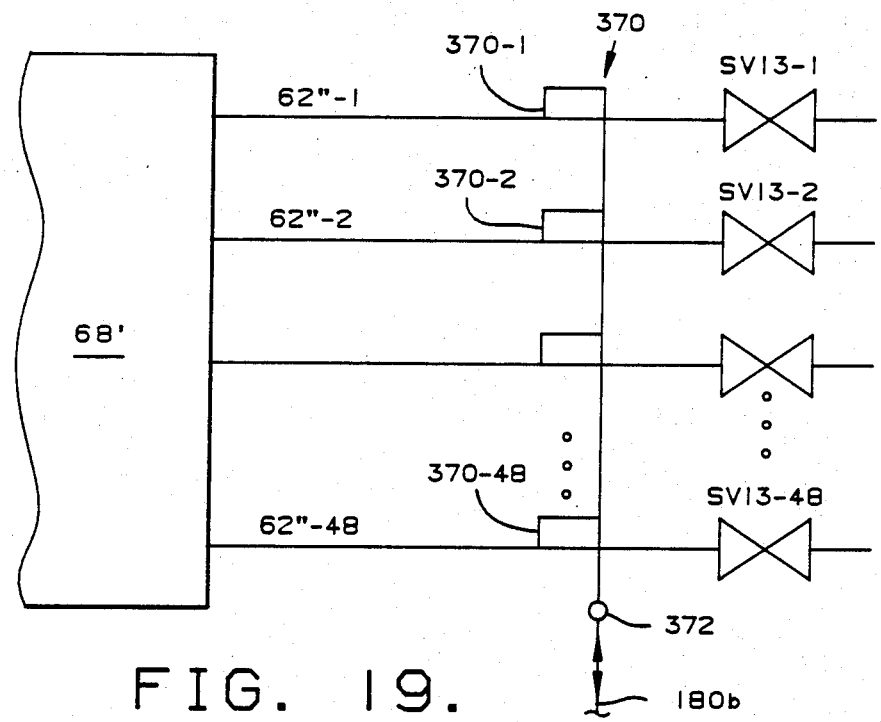
FIG. 19 is a schematic diagram illustrating the internal flow function of a propulsion flow header employed in the system of FIG. 18.

The flow header 70 is discussed with concurrent reference to FIGS. 18 and 19, FIG. 19 being a schematic representation thereof. Header 370 has a single input 372 which connects through parallel paths 370-1 through 370-48 to the forty-eight (48) tubes 62" of chamber 68 and the forty-eight (48) in-line valves SV13. Tube 180a connects tube 180-7 through valve SVa to the bi-directional flow tube 180b, and the latter is connected for the reverse or return flow condition through valve SVb, when opened, and tube 180c to the return tube 180-4.

Thus, use of the header 370 and the two valves SVa and SVb permits elimination of the forty-eight (48) bypass valves SV14 of the valve systems 66 in FIG. 7A. Further, the system 170' functions in a closed loop for all internal detector string transport operations, using solely the coolant existing within the lines, vessels and devices which in fact are common to both system 170 and system 170'. Accordingly, it will be understood that the forty-eight (48) valves SV13 are closed during these internal operations, both to act as stops relative to transfer of detector strings into the chamber 68 and to isolate the internal system 170' from the tubes extending to the vessel 50. It follows as well that the valves SV6 and SV8 are closed during these internal transport operations.

By opening valve SVa and closing SVb, coolant existent within the system 170' is directed into the header 370 to transport any selected detector string, in accordance with the position of transfer device 70, into the gamma counter 80, SV4 being opened to complete the fluid flow circuit to pump 176 and SV5 being closed. The reverse flow for transporting a detector string from the gamma counter 80 back to its assigned position within the chamber 68 is achieved by the opposite, opened and closed conditions of SVa, SVb, SV4 and SV5. The closed state of valves SV13 throughout these operations both isolates the reactor coolant and assures the proper flow direction in the header 370 while additionally serving as a mechanical stop for the detector strings during the return from counter 80 to the chamber 68.

Loading of a new detector string is the same as that performed by the system of FIG. 7A, through the step of locating the detector string in the gamma counter 80. Thereafter, with SV4 closed, SV5 is opened, as before, but now the flow proceeds through flow header 370, with SVa closed and SVb open and thus through tube 180c and return tube 180-4, for completing the flow circuit to the pump 176, thereby transporting the new detector string out of counter 80 and through device 70 into the proper position in chamber 68.

Discharging a spent detector string again involves the use of header 370. SVa is opened and SVb is closed to produce a flow from pump 176 through tubes 180-7 and 180-7a and bi-directional tube 180b to the header 370 and from header 370 through chamber 68, counter 80, and open valve SV4 (with valve SV5 closed) and the return tubes 183 and 184 to complete the fluid circuit to the pump. With the device 70 appropriately positioned, the spent detector string is transported from chamber 68 into counter 80. The path for driving the detector string from counter 80 into the spent detector storage vessel 174 includes tube 180-2, 180-7 and 180-7a, opened valve SV5 (with SVr closed) SV3 opened, transfer device 70 positioned at connection 70-2, discharge tube 180-11 and opened valves SV11 and SV12, the return path being completed through tubes 180-12 and 180-4 to pump 176.

Thus, since no flow of primary coolant to or from the reactor vessel is required in these internal transport operations, substantial contamination and clogging problems which that flow may produce is avoided. In the transport of the detector strings, either simultaneously as to all or selectively as to one or more individual detector strings from the chamber 68 to the reactor vessel 50 and return, the appropriate valve or valves SV13 is/are opened, SVa and SVb are both closed (as a result of which header 370 serves no function), and valves SV6 and SV8 along with valves SV9 and SV10 are operated as in the case of the system of FIG. 7A to provide the appropriate motive flow through tube 180-8 to or from transfer device 70.

It will be recognized by those of skill in the art that numerous modifications and adaptations may be made to the various structures and the systems disclosed herein and in the method of operation thereof and thus it is intended by the appended claims to encompass all such modifications which fall within the true spirit and scope of the invention.

We claim as our invention:

1. In a nuclear reactor pressure vessel having an outer enclosure defined by a generally cylindrical sidewall with a generally vertical central axis and upper and lower edges, and top and bottom heads secured in sealed relationship to the upper and lower edges, respectively, of the cylindrical sidewall, and the vessel enclosing therein a core including a plurality of elongated fuel element assemblies mounted in parallel axial relationship between vertically spaced lower and upper core support plates supported at respective, lower and intermediate, vertically spaced positions of the cylindrical sidewall of the vessel and an upper internals support plate supported within and adjacent the upper end of the cylindrical sidewall of the vessel, an instrumentation system comprising:

plural instrumentation thimbles, each of elongated and generally cylindrical sidewall configuration and defining an elongated interior passageway of a predetermined, fixed diameter, and having an open, upper end, a closed, lower end and having flow holes in the sidewall adjacent the lower end, said thimbles being disposed in generally parallel axial relationship centrally within respective fuel element assemblies and thus at predetermined positions intermediate the upper and lower core support plates;

plural bores in the upper core support plate in alignment with the respective, plural instrumentation thimbles;

plural head penetrations and associated, plural head penetration columns, each said head penetration being of generally elongated, cylindrical configuration and extending in parallel axial relationship through the top head of the vessel and in sealed relationship therewith and having a first, lower end within the interior of the vessel top head and a second, upper end exterior of the vessel top head;

each of said plural head penetration columns being of generally elongated, cylindrical configuration and correspondingly having a cylindrical sidewall and a first, lower end and a second, upper end;

means for supporting the first, lower ends of said head penetration columns on the upper internals support plate, said head penetration columns extending in parallel axial relationship through said respective head penetrations and said second, upper ends thereof being disposed above the second, upper ends of the respective head penetrations;

means for mechanically securing each said head penetration column to its associated head penetration and for sealing the head penetration column to the second, upper end of said associated, head penetration;

plural detector guide tubes, each defining an interior passageway, as aforesaid, extending from the upper end of an associated head penetration column and passing therewith through the respectively associated head penetration and into the interior of said upper head and through the sidewall of the penetration column to respective, said predetermined positions and correspondingly aligned with respective said instrumentation thimbles;

said upper internals support plate further comprising a plurality of bores positioned in alignment with said predetermined positions and respectively associated instrumentation thimbles;

plural elongated, generally cylindrical column tubes defining respective interior passageways therethrough, as aforesaid, each extending through a respective bore in said upper internal support plate and having a first upper end at said predetermined position and a second lower end disposed adjacent the open, upper end of an associated instrumentation thimble;

plural first means connecting corresponding said detector guide tubes to said first upper ends of said respective column tubes; and plural second means connecting said second, lower ends of said column tubes to said respective, open and upper ends of said instrumentation thimbles.

2. An instrumentation system as recited in claim 1, wherein:

each said second means comprises a ball and cone joint defined by the open and upper end of the associated instrumentation thimble and the second, lower end of the associated, aligned column tube.

3. A system as recited in claim 2, wherein there is further provided:

plural resilient biasing means respectively associated with said column tubes and secured to the upper internals support plate, for producing an axially downward resilient force on the respective column tube for maintaining the associated ball and cone connection in sealed engagement.

4. A system as recited in claim 3, further comprising:

plural upper internals support columns of generally elongated cylindrical configuration, each extending between and secured at the first, lower and second, upper ends thereof to said upper core plate and said upper internals support plate, respectively, and receiving a respective one of said plural column tubes coaxially therethrough;

said plural upper internals support columns being in axial aligned relationship with respective said plural instrumentation thimbles;

the second, upper end of each said upper internals support column being received through a corresponding, axially aligned bore in the upper internals support plate and defining an interior, cylindrical spring chamber therein;

each said column tube having a collar affixed thereon and received within the associated spring chamber; and a spring mounted within the spring chamber and urged against the collar on the corresponding column tube for resiliently urging the column tube axially downwardly to maintain a sealed connection of the associated ball and cone joint.

5. An instrumentation system as recited in claim 4, wherein:

the lower end of each said spring chamber defines an abutment surface relative to said collar on said column tube; and all of said upper internal support columns and associated said column tubes being removable by upward axial movement of said upper support plate.

6. An instrumentation system as recited in claim 34, further comprising:

plural guide tube jumper bundles associated with respective said head penetration columns, each jumper bundle defining therein a plurality of elongated interior passageways, each as aforesaid, respectively corresponding to the plural detector guide tubes of the respectively associated head penetration column; and plural flanged disconnect joints respectively associated with said plural jumper bundles and with the associated detector guide tubes of respective, said plural head penetration columns, each said flanged joint comprising:

first and second face contact plugs, each said first face contact plug having plural interior passageways therethrough respectively corresponding to said plural interior passageways of said associated jumper bundle and affixed in sealed relationship thereto and each said second face contact plug having plural interior passageways therethrough respectively corresponding to said detector guide tubes of said respective head penetration column and affixed thereto in sealed relationship; and means for mechanically joining said face contact plugs together with said respectively associated passageways thereof in aligned relationship and in face contact, sealing relationship and for sealing the respective perimeters of said plugs.

* * * * *